United States Patent
Kim et al.

(10) Patent No.: US 11,003,278 B2
(45) Date of Patent: May 11, 2021

(54) TOUCH DISPLAY DEVICE, DRIVING CIRCUIT, AND DRIVING METHOD

(71) Applicant: LG Display Co., Ltd., Seoul (KR)

(72) Inventors: SungChul Kim, Paju-si (KR); HoonBae Kim, Seoul (KR); SunYeop Kim, Seoul (KR); Seongkyu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/710,829

(22) Filed: Dec. 11, 2019

(65) Prior Publication Data
US 2020/0210018 A1    Jul. 2, 2020

(30) Foreign Application Priority Data

Dec. 27, 2018 (KR) .................. 10-2018-0170592
May 28, 2019 (KR) .................. 10-2019-0062755

(51) Int. Cl.
*G06F 3/041* (2006.01)
*G09G 3/36* (2006.01)
*G06F 3/044* (2006.01)

(52) U.S. Cl.
CPC .......... *G06F 3/0416* (2013.01); *G06F 3/0412* (2013.01); *G06F 3/0446* (2019.05); *G09G 3/3674* (2013.01); *G09G 3/3685* (2013.01); *G09G 2310/027* (2013.01); *G09G 2310/0213* (2013.01); *G09G 2310/08* (2013.01)

(58) Field of Classification Search
CPC .... G06F 3/0416; G06F 3/0446; G06F 3/0412; G06F 3/0443; G06F 3/04166; G09G 3/3674; G09G 3/3685; G09G 2310/027; G09G 2310/08; G09G 2310/0213; G09G 2310/0275; G09G 2320/0626; G09G 2320/0666; G09G 2360/141; G09G 3/32; G09G 2354/00
See application file for complete search history.

(56) References Cited

U.S. PATENT DOCUMENTS

| | | | | |
|---|---|---|---|---|
| 9,024,913 | B1* | 5/2015 | Jung | G09G 3/3688 345/174 |
| 9,244,560 | B2* | 1/2016 | Ningrat | G06F 3/04164 |
| 9,910,333 | B2* | 3/2018 | Shin | G02F 1/136286 |
| 2009/0268145 | A1* | 10/2009 | Anjo | G02F 1/13306 349/141 |
| 2011/0267293 | A1* | 11/2011 | Noguchi | G06F 3/0416 345/173 |
| 2012/0075214 | A1* | 3/2012 | Kim | G06F 3/041 345/173 |
| 2012/0081328 | A1* | 4/2012 | Kandziora | G06F 3/0445 345/174 |
| 2013/0016065 | A1* | 1/2013 | Reynolds | G06F 3/0412 345/174 |

(Continued)

*Primary Examiner* — Grant Sitta
(74) *Attorney, Agent, or Firm* — Fenwick & West LLP

(57) ABSTRACT

A touch display device, a driving circuit, and a driving method are provided. An image defect which occurs when display driving and touch driving are simultaneously executed can be reduced by performing control such that a voltage level of a touch electrode driving signal (TDS) varies in a section other than a high-level period (Pon) of an ON-clock signal (ON_CLK) and/or a high-level period (Poff) of an OFF-clock signal (OFF_CLK).

24 Claims, 32 Drawing Sheets

(56) References Cited

U.S. PATENT DOCUMENTS

| | | | |
|---|---|---|---|
| 2013/0093706 A1* | 4/2013 | Kurasawa | G06F 3/0443 |
| | | | 345/173 |
| 2013/0342770 A1* | 12/2013 | Kim | G06F 3/0443 |
| | | | 349/12 |
| 2015/0123942 A1* | 5/2015 | Huang | G06F 3/0445 |
| | | | 345/174 |
| 2015/0145819 A1* | 5/2015 | Bae | G06F 3/0412 |
| | | | 345/174 |
| 2016/0179273 A1* | 6/2016 | Lee | G06F 3/04166 |
| | | | 345/174 |
| 2016/0291756 A1* | 10/2016 | Li | G06F 3/0412 |
| 2017/0052614 A1* | 2/2017 | Hsiao | G06F 3/044 |
| 2017/0102824 A1* | 4/2017 | Kang | G06F 3/04166 |
| 2017/0212626 A1* | 7/2017 | Zhao | G06F 3/0443 |
| 2017/0242529 A1* | 8/2017 | Park | G06F 3/044 |
| 2018/0113501 A1* | 4/2018 | Iwaki | G06F 3/0412 |
| 2018/0136778 A1* | 5/2018 | Choi | G09G 3/20 |
| 2018/0239488 A1* | 8/2018 | Lin | G06F 3/0416 |

* cited by examiner

FIG.9
TDS
(Case 1) TDS1 
(Case 2) TDS2 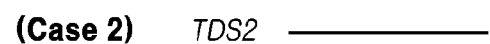
(Case 3) TDS3 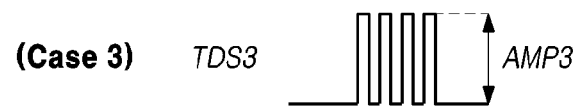

(Case 1)

(Case 2)

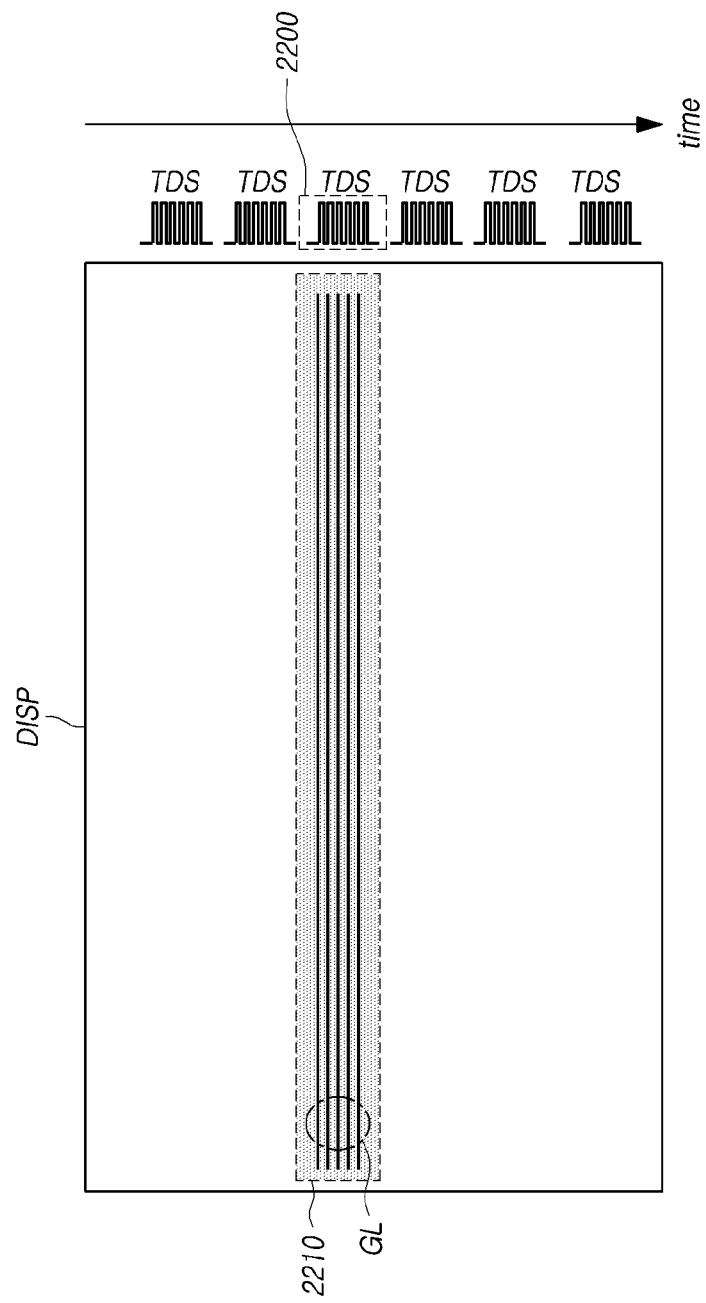

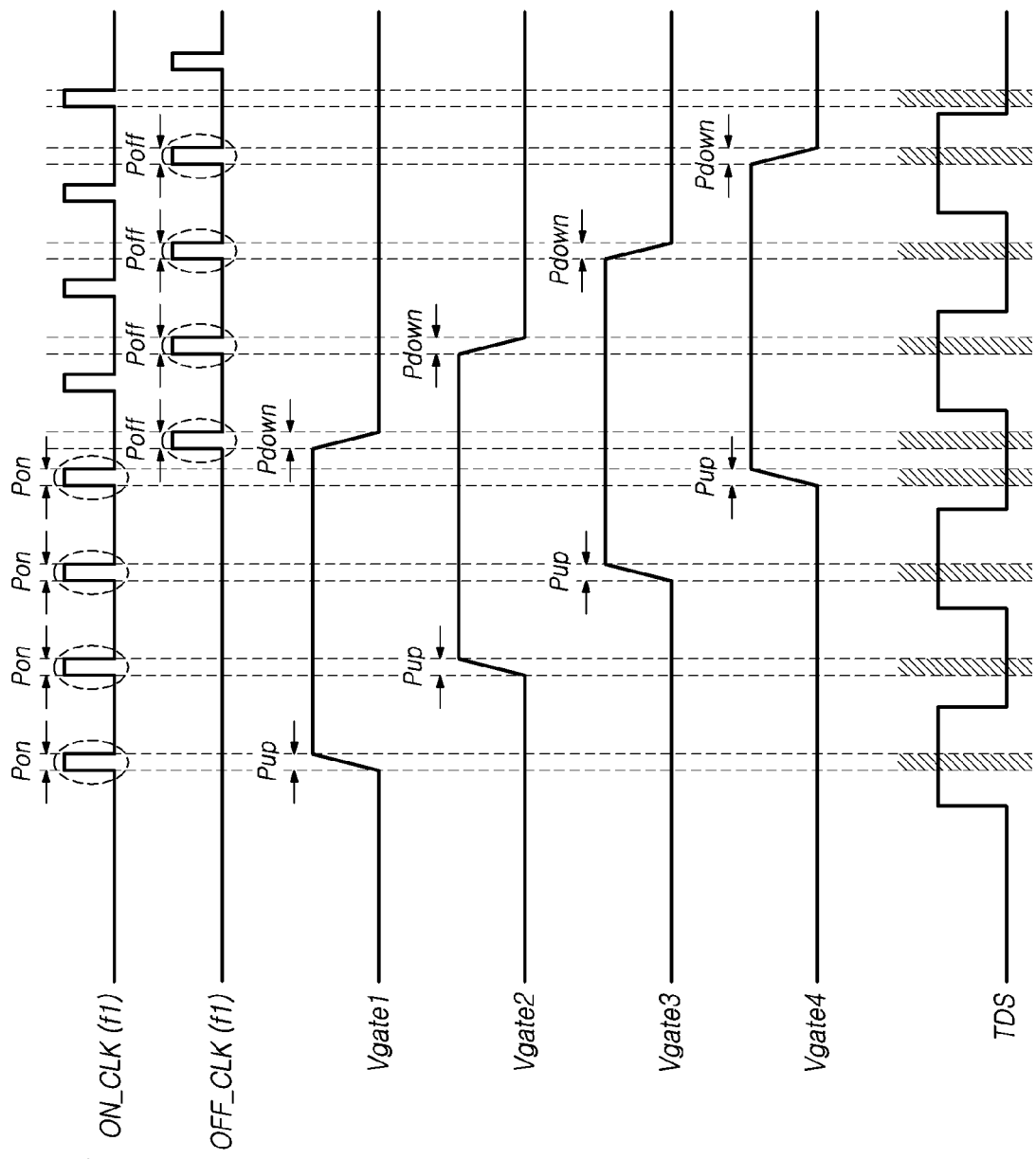

TOUCH DISPLAY DEVICE, DRIVING CIRCUIT, AND DRIVING METHOD

CROSS REFERENCE TO RELATED APPLICATION

This application claims priority from the Republic of Korea Patent Application No. 10-2018-0170592, filed on Dec. 27, 2018, and the Republic of Korea Patent Application No. 10-2019-0062755, filed on May 28, 2019, each of which is hereby incorporated by reference in its entirety.

BACKGROUND

Field of Technology

Embodiments of the present disclosure relate to a touch display device, a driving circuit, and a driving method.

Discussion of the Related Art

With advancement in information-oriented societies, requirements for touch display devices displaying an image have increased in various types, and various display devices such as a liquid crystal display device and an organic light emitting display device have been widely utilized in recent years.

Among such display devices, there is a touch display device that provides a touch-based input system enabling a user to easily, intuitively, and conveniently input information or commands instead of normal input systems using buttons, a keyboard, a mouse, and the like.

In a touch display device according to the related art, since both an image display function and a touch sensing function must be provided, display driving for displaying an image and touch driving for sensing a touch are alternately performed at divided time intervals.

In such a time-division driving system, considerably elaborate timing control is required for accurately performing display driving and touch driving at divided times in a time-division manner, and expensive electronic components may be required.

In the time-division driving system, both a display driving time and a touch driving time may be insufficient and thus there is a problem in that image quality and touch sensitivity decrease. Particularly, there may be a problem in that image quality with a high resolution is not provided due to time-division driving.

Simultaneous execution of display driving and touch has been studied, but there is considerable technical difficulty in simultaneously executing display driving and touch driving.

In order to simultaneously execute display driving and touch driving, display driving and touch driving have to be stably and accurately executed, display driving should not interfere with touch driving, and touch driving should not interfere with display driving.

However, there are problems with occurrence of an image defect and the like because touch driving is affected by display driving or display driving is affected by touch driving. Particularly, such problems become severe when touch sensors (touch electrodes) are embedded in a display panel and are not easily solvable.

SUMMARY

An objective of embodiments of the disclosure is to provide a touch display device, a driving circuit, and a driving method that can simultaneously stably execute display driving and touch driving.

Another objective of embodiments of the disclosure is to provide a touch display device, a driving circuit, and a driving method that can simultaneously stably execute display driving and touch driving using a display panel having touch sensors embedded therein.

Another objective of embodiments of the disclosure is to provide a touch display device, a driving circuit, and a driving method that can reduce an image defect of a line shape which may be caused by timing mismatch between a gate driving relevant signal and a touch electrode driving signal.

According to an aspect of the disclosure, there is provided a touch display device including: a display panel in which a plurality of data lines and a plurality of gate lines are arranged, a plurality of subpixels are arranged, and a plurality of touch electrodes are arranged; a display controller that outputs an ON-clock signal and an OFF-clock signal; a gate driving circuit that outputs a scan signal to the plurality of gate lines on the basis of the ON-clock signal and the OFF-clock signal; a data driving circuit that outputs a data signal for displaying an image to the plurality of data lines; and a touch driving circuit that supplies a touch electrode driving signal, a voltage level of which varies in a section other than a high-level period of the ON-clock signal or a high-level period of the OFF-clock signal, to one or more of the plurality of touch electrodes, senses one or more of the plurality of touch electrodes, and outputs sensing data.

The touch display device may further include a touch controller that detects whether there is a touch or a touch coordinate on the basis of the sensing data.

The touch controller may perform control such that the voltage level of the touch electrode driving signal varies in a section other than the high-level period of the ON-clock signal or the high-level period of the OFF-clock signal.

A frequency of the ON-clock signal and the OFF-clock signal may be N or 1/N times a frequency of the touch electrode driving signal (where N is a natural number).

The touch electrode driving signal may have a constant duty ratio.

A frequency of the ON-clock signal and the OFF-clock signal may be other than N or 1/N times a frequency of the touch electrode driving signal (where N is a natural number).

The touch electrode driving signal may have a variable duty ratio.

The touch electrode driving signal may include a first signal section having a first duty ratio and a second signal section having a second duty ratio which is different from the first duty ratio. Since the second signal section of the touch electrode driving signal has the second duty ratio which is different from the first duty ratio, the voltage level in the second signal section of the touch electrode driving signal can vary in a section other than the high-level period of the ON-clock signal and the high-level period of the OFF-clock signal.

The voltage level of the touch electrode driving signal may vary in a section other than a rising section or a falling section of the scan signal.

The touch driving circuit may sense at least one of the plurality of touch electrodes when display driving is being executed by supplying the data signal for displaying an image to the plurality of data lines.

The touch electrode driving signal may be a signal of which a voltage level varies periodically, and a period or a width of a high-level voltage period of the touch electrode driving signal may be longer than one horizontal time for display driving.

In this case, in the period of the high-level voltage period of the touch electrode driving signal, a voltage level of the data signal for displaying an image which is supplied to at least one data line of the plurality of data lines may vary one or more times, or a voltage level of the scan signal which is supplied to at least one gate line of the plurality of gate lines may vary one or more times.

The touch electrode driving signal may be a signal of which a voltage level varies periodically, and a period or a width of a high-level voltage period of the touch electrode driving signal may be shorter than one horizontal time for display driving.

In this case, in the one horizontal time for display driving, the voltage level of the touch electrode driving signal may vary one or more times.

The data driving circuit may convert an image digital signal into an image analog signal in response to a gamma reference voltage and output the data signal corresponding to the image analog signal to the data lines, and a frequency and a phase of the gamma reference voltage may correspond to those of the touch electrode driving signal.

The high-level period of the ON-clock signal and the high-level period of the OFF-clock signal may correspond to each other.

A low-level period of the ON-clock signal and a low-level period of the OFF-clock signal may correspond to each other.

A falling section of a first scan signal which is supplied to a first gate line of the plurality of gate lines may correspond to a rising section of another scan signal which is supplied to a gate line other than the first gate line out of the plurality of gate lines.

The first gate line and the other gate line may overlap the same touch electrode.

The other gate line may be a gate line adjacent to the first gate line. On the other hand, one or more gate lines may be disposed between the first gate line and the other gate line.

According to another aspect of the disclosure, there is provided a touch display device including: a display panel in which a plurality of data lines and a plurality of gate lines are arranged, a plurality of subpixels are arranged, and a plurality of touch electrodes are arranged; a gate driving circuit that sequentially outputs a scan signal to the plurality of gate lines; a data driving circuit that outputs a data signal to the plurality of data lines; and a touch driving circuit that supplies a touch electrode driving signal, a voltage level of which varies in a section other than a rising section or a falling section of the scan signal, to one or more of the plurality of touch electrodes.

A falling section of a first scan signal which is supplied to a first gate line of the plurality of gate lines may correspond to a rising section of another scan signal which is supplied to a gate line other than the first gate line out of the plurality of gate lines.

The first gate line and the other gate line may overlap the same touch electrode.

According to another aspect of the disclosure, there is provided a driving circuit including: a data driving circuit that outputs a data signal to data lines which are arranged on a display panel; and a touch driving circuit that drives one or more of a plurality of touch electrodes which are arranged on the display panel and outputs a touch electrode driving signal, a voltage level of which varies in a section other than a rising section or a falling section of a scan signal which is output to gate lines arranged on the display panel, to one or more of the plurality of touch electrodes.

The data driving circuit may convert an image digital signal into an image analog signal in response to a gamma reference voltage which is modulated in synchronization with the touch electrode driving signal and output the data signal corresponding to the image analog signal to the data lines.

A frequency and a phase of the gamma reference voltage may correspond to those of the touch electrode driving signal.

A falling section of a first scan signal which is supplied to a first gate line of the plurality of gate lines may correspond to a rising section of another scan signal which is supplied to a gate line other than the first gate line out of the plurality of gate lines.

The first gate line and the other gate line may overlap the same touch electrode.

According to another aspect of the disclosure, there is provided a driving method of a touch display device, including: a step of respectively outputting a data signal and a scan signal to data lines and gate lines which are arranged on a display panel and outputting a touch electrode driving signal to one or more of a plurality of touch electrodes which are arranged on the display panel; and a step of displaying an image in response to the data signal and the touch electrode driving signal and sensing a touch on the basis of a result of sensing of the touch electrodes to which the touch electrode driving signal is supplied.

A voltage level of the touch electrode driving signal may vary in a section other than a rising section or a falling section of a scan signal.

A falling section of a first scan signal which is supplied to a first gate line of the plurality of gate lines may correspond to a rising section of another scan signal which is supplied to a gate line other than the first gate line out of the plurality of gate lines.

The first gate line and the other gate line may overlap the same touch electrode.

According to embodiments of the disclosure, it is possible to provide a touch display device, a driving circuit, and a driving method that can simultaneously stably execute display driving and touch driving.

According to embodiments of the disclosure, it is possible to provide a touch display device, a driving circuit, and a driving method that can simultaneously stably execute display driving and touch driving using a display panel having touch sensors embedded therein.

According to embodiments of the disclosure, it is possible to provide a touch display device, a driving circuit, and a driving method that can reduce an image defect of a line shape which may be caused by timing mismatch between a gate driving relevant signal and a touch electrode driving signal.

BRIEF DESCRIPTION OF THE DRAWINGS

FIG. 9 is a diagram illustrating touch electrode driving signals TDS in three cases of time-free driving in the touch display device according to one embodiment;

FIGS. 21 and 22 are diagrams illustrating a case in which a voltage level of a touch electrode driving signal varies in a high-level section of an OFF-clock signal and an image defect of a line pattern based thereon in the touch display device according to one embodiment;

FIGS. 23A and 23B are diagrams illustrating a driving method for reducing an image defect of a line pattern from occurring due to timing mismatch between a gate driving relevant signal and a touch electrode driving signal in the touch display device according to one embodiment;

DETAILED DESCRIPTION

Figure 1:
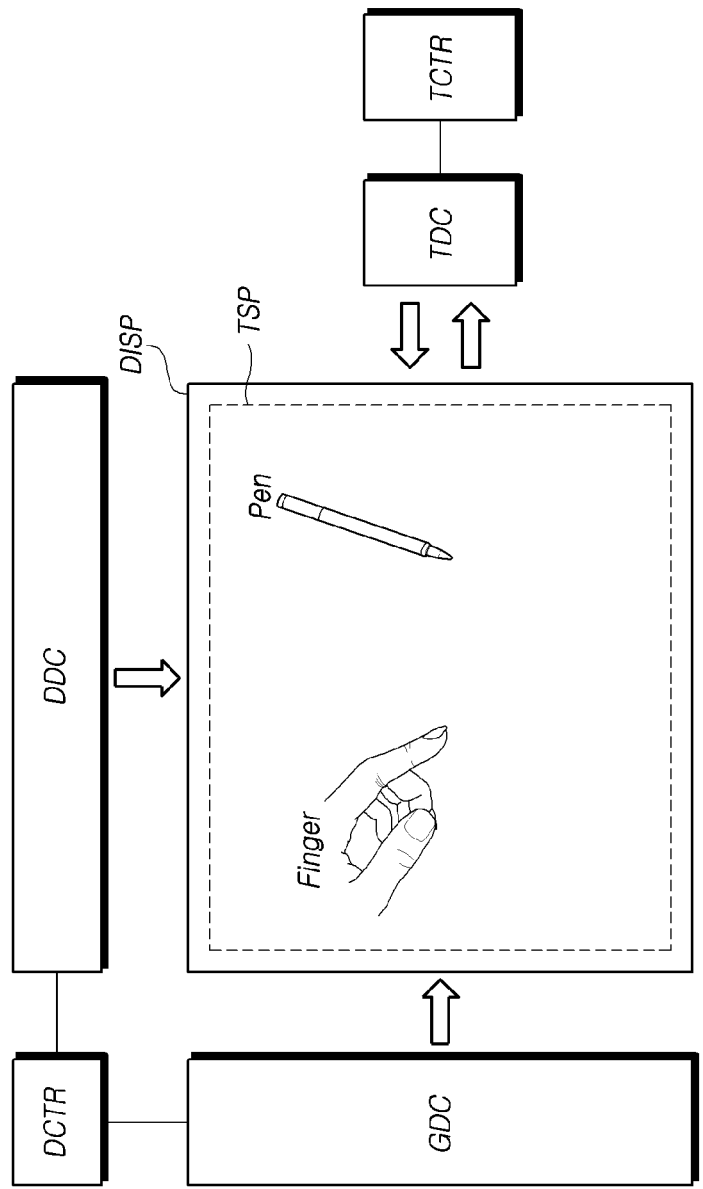
FIG. 1 is a diagram schematically illustrating a system configuration of a touch display device according to one embodiment.

Advantages and features of the disclosure and methods for achieving the advantages or features will be apparent from embodiments described below in detail with reference to the accompanying drawings. However, the disclosure is not limited to the embodiments but can be modified in various forms. The embodiments are provided merely for completing the disclosure of the invention and are provided for completely informing those skilled in the art of the scope of the disclosure. The scope of the invention is defined by only the appended claims.

Shapes, sizes, ratios, angles, number of pieces, and the like illustrated in the drawings, which are provided for explaining the embodiments of the disclosure, are exemplary and thus the disclosure is not limited to the illustrated details. In the following description, like elements are referenced by like reference numerals. When it is determined that detailed description of the relevant known functions or configurations involved in the disclosure makes the gist of the disclosure obscure, the detailed description thereof will not be made. When "include," "have", "be constituted", and the like are mentioned in the specification, another element may be added unless "only" is used. A singular expression of an element includes two or more elements unless differently mentioned.

In construing elements in embodiments of the disclosure, an error range is included even when explicit description is not made.

Terms such as "first", "second", "A", "B", "(a)", and "(b)" can be used to describe elements of the disclosure. These terms are merely used to distinguish one element from another element and the essence, order, sequence, number, or the like of the elements is not limited to the terms. If it is mentioned that an element is "linked," "coupled," or "connected" to another element, it should be understood that the element can be directly coupled or connected to another element or still another element may be "interposed" therebetween or the elements may be "linked," "coupled," or "connected" to each other with still another element interposed therebetween. For example, when positional relationships between two parts are described using 'on-', 'over-', 'under-', 'next-', and the like, one or more other parts may be disposed between the two parts unless 'just' or 'direct' is used.

Terms such as "first", "second", and the like can be used to describe various elements, but the elements should not be limited to the terms. The terms are used only to distinguish an element from another. Therefore, a first element may be a second element within the technical spirit of the disclosure.

Features (elements) of embodiments of the disclosure can be coupled or combined with each other or separated from each other partially or on the whole and can be technically interlinked and driven in various forms. The embodiments may be put into practice independently or in combination.

Hereinafter, embodiments of the disclosure will be described in detail with reference to the accompanying drawings.

Figure 2:
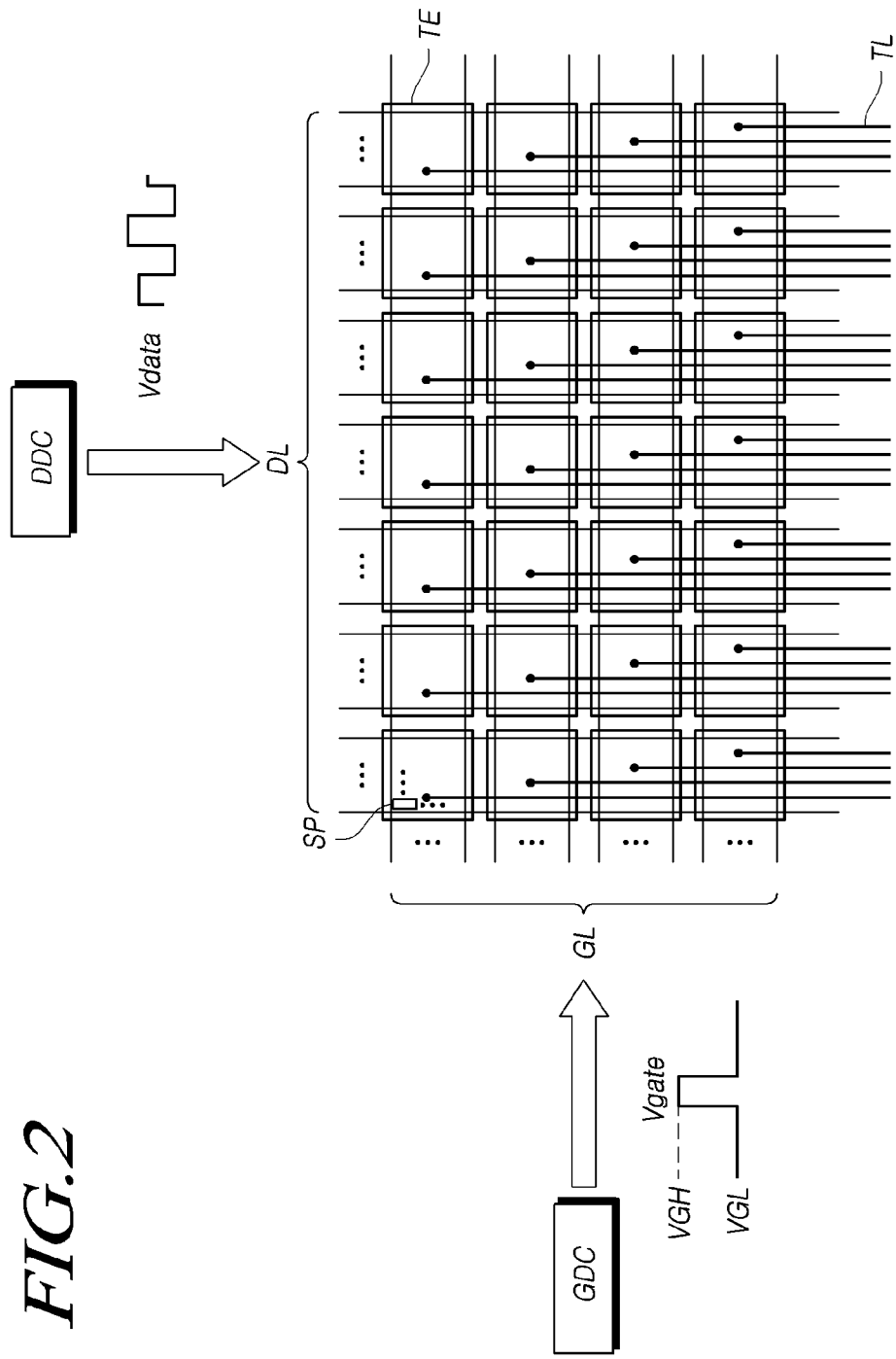
FIG. 2 is a diagram schematically illustrating display driving of the touch display device according to one embodiment.
Figure 3:
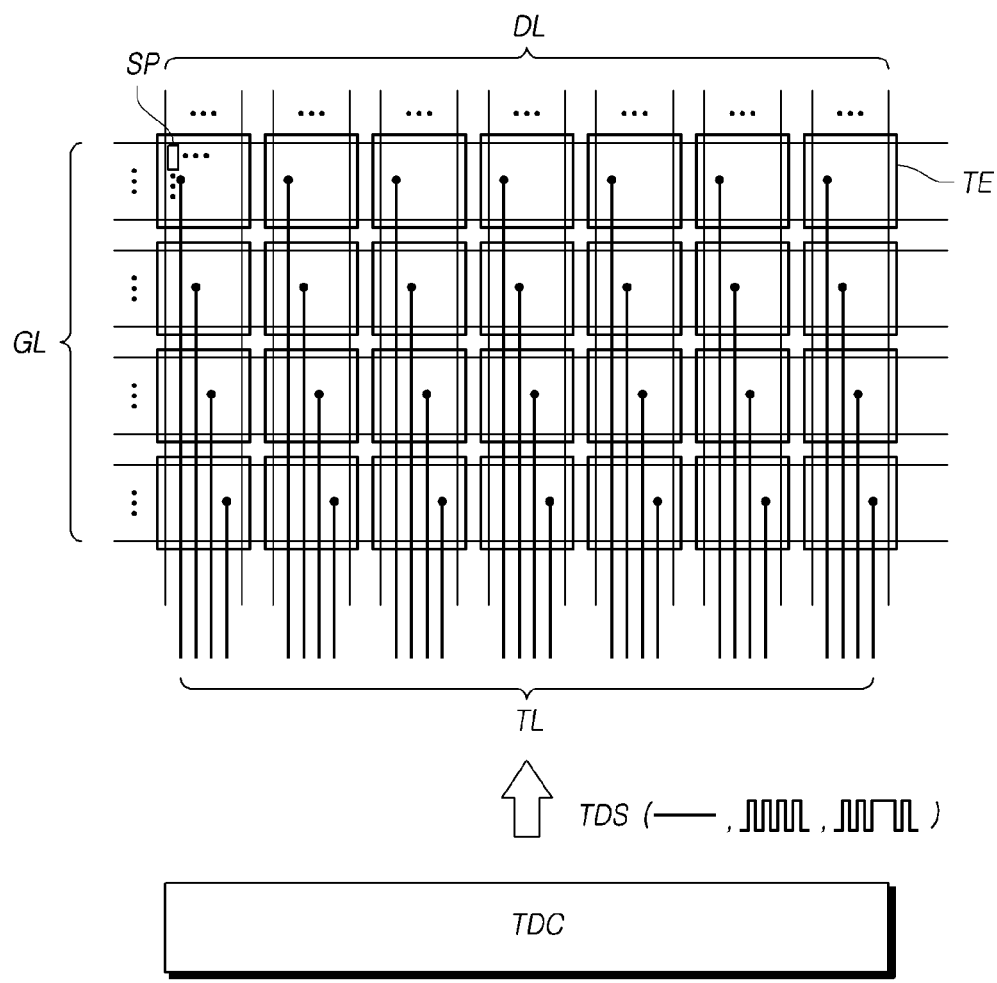
FIG. 3 is a diagram schematically illustrating touch driving of the touch display device according to one embodiment.

FIG. 1 is a diagram schematically illustrating a system configuration of a touch display device according to one embodiment. FIG. 2 is a diagram schematically illustrating display driving of the touch display device according to one embodiment. FIG. 3 is a diagram schematically illustrating touch driving of the touch display device according to one embodiment.

Referring to FIG. 1, a touch display device can provide a display function of displaying an image. The touch display device can also provide a touch sensing function of sensing a user's touch and a touch input function of performing an input process based on a user's touch using the touch sensing result.

In the following description, elements for providing a display function and display driving will be described with reference to FIGS. 1 and 2, and elements for providing a touch sensing function and touch driving will be described with reference to FIGS. 1 and 3.

Referring to FIGS. 1 and 2, the touch display device includes a display panel DISP in which a plurality of data lines DL and a plurality of gate lines GL are arranged and a plurality of subpixels SP defined by the plurality of data lines DL and the plurality of gate lines GL are arranged, a data driving circuit DDC that drives the plurality of data lines DL, a gate driving circuit GDC that drives the plurality of gate lines GL, and a display controller DCTR that controls the data driving circuit DDC and the gate driving circuit GDC.

The display controller DCTR supplies various control signals to the data driving circuit DDC and the gate driving circuit GDC and controls the data driving circuit DDC and the gate driving circuit GDC.

The display controller DCTR starts scanning at timings which are realized in each frame, converts input image data which is input from the outside to correspond to a data signal format which is used in the data driving circuit DDC, outputs the converted image data, and controls data driving at appropriate timings to correspond to the scanning.

The gate driving circuit GDC sequentially supplies a gate signal of an ON voltage or an OFF voltage to the plurality of gate lines GL under the control of the display controller DCTR.

When a specific gate line GL is selected by the gate driving circuit GDC, the data driving circuit DDC converts an image data signal which is received from the display controller DCTR into an image analog signal and supplies a data signal Vdata corresponding thereto to the plurality of data lines DL.

The display controller DCTR may be a timing controller which is used for normal display techniques or a control device that performs another control function in addition to the timing controller or may be a control device that is different from the timing controller.

The display controller DCTR may be embodied as a component separated from the data driving circuit DDC or may be embodied as an integrated circuit along with the data driving circuit DDC.

The data driving circuit DDC drives the plurality of data lines DL by supplying a data signal Vdata to the plurality of data lines DL. Here, the data driving circuit DDC is also referred to as a "source driver".

The data driving circuit DDC may include at least one source driver integrated circuit SDIC. Each source driver integrated circuit SDIC may include a shift register, a latch circuit, a digital-to-analog converter DAC, and an output buffer circuit. Each source driver integrated circuit SDIC may further include an analog-to-digital converter ADC in some cases.

Each source driver integrated circuit SDIC may be connected to a bonding pad of the display panel DISP in a tape automated bonding (TAB) system or a chip-on-glass (COG) system, may be disposed directly on the display panel DISP, or may be integrated and disposed on the display panel DISP in some cases. Each gate driver integrated circuit GDIC may be realized in a chip-on-film (COF) system in which it is mounted on a film connected to the display panel DISP.

The gate driving circuit GDC sequentially drives the plurality of gate lines GL by sequentially supplying a scan signal Vgate (which is also referred to as a scan voltage, a scan signal, or a gate voltage) to the plurality of gate lines GL. Here, the gate driving circuit GDC is also referred to as a "scan driver."

Here, the scan signal Vgate is constituted by an OFF-level gate voltage for closing the corresponding gate line GL and an ON-level gate voltage for opening the corresponding gate line GL.

More specifically, the scan signal Vgate is constituted by an OFF-level gate voltage for turning off transistors connected to the corresponding gate line GL and an ON-level gate voltage for turning on the transistors connected to the corresponding gate line GL.

When the transistors are of an N type, the OFF-level gate voltage may be a low-level gate voltage VGL_M and the ON-level gate voltage may be a high-level gate voltage VGH_M. When the transistors are of a P type, the OFF-level gate voltage may be a high-level gate voltage VGH_M and the ON-level gate voltage may be a low-level gate voltage VGL_M. In the following description, for the purpose of convenience of explanation, it is assumed that the OFF-level gate voltage is a low-level gate voltage VGL_M and the ON-level gate voltage is a high-level gate voltage VGH_M.

The gate driving circuit GDC may include at least one gate driver integrated circuit GDIC. Each gate driver integrated circuit GDIC may include a shift register and a level shifter.

Each gate driver integrated circuit GDIC may be connected to a bonding pad of the display panel DISP in a tape automated bonding (TAB) system or a chip on glass (COG) system or may be realized in a gate in panel (GIP) system and disposed directly on the display panel DISP. In some cases, each gate driver integrated circuit GDIC may be integrated and disposed on the display panel DISP. Each gate driver integrated circuit GDIC may be realized in a chip on film (COF) system in which it is mounted on a film connected to the display panel DISP.

The data driving circuit DDC may be disposed on only one side (for example, an upper side or a lower side) of the display panel DISP as illustrated in FIG. 1 or may be disposed on both sides (in other words, two opposite sides; for example, the upper side and the lower side) of the display panel DISP depending on a driving system, a panel design system, or the like in some cases.

The gate driving circuit GDC may be disposed on only one side (for example, a right side or a left side) of the display panel DISP as illustrated in FIG. 1 or may be disposed on both sides (in other words, two opposite sides; for example, the right side and the left side) of the display panel DISP depending on a driving system, a panel design system, or the like in some cases.

The touch display device may be various types of display devices such as a liquid crystal display device and an organic light-emitting display device. The display panel DISP may be various types of display panels such as a liquid crystal display panel and an organic light-emitting display panel.

Each subpixel SP arranged in the display panel DISP may include one or more circuit elements (for example, a transistor and a capacitor).

For example, when the display panel DISP is a liquid crystal display panel, a pixel electrode is disposed in each subpixel SP and a transistor is electrically connected between the pixel electrode and the corresponding data line DL. The transistor can be turned on by a scan signal Vgate which is supplied to a gate node via the corresponding gate line GL, and can output a data signal Vdata which is supplied to a source node (or a drain node) via the corresponding data line DL to the drain node (or the source node) and apply the data signal Vdata to the pixel electrode electrically connected to the drain node (or the source node) when it is turned on. An electric field is formed between the pixel electrode to which the data signal Vdata is applied and a common electrode to which a common voltage Vcom is applied, and a capacitor can be formed between the pixel electrode and the common electrode.

The structure of each subpixel SP can be determined variously depending on a panel type, a provided function, a design system, and the like.

Referring to FIGS. 1 and 3, the touch display device may include a touch panel TSP, a touch driving circuit TDC that drives the touch panel TSP and performs sensing, and a touch controller TCTR that senses a touch using the sensing result of the touch panel TSP from the touch driving circuit TDC to provide a touch sensing function.

The display panel DISP can be touched or approached by a user's pointer. Touch sensors may be disposed on the touch panel TSP.

Here, a user's pointer may be a finger or a pen.

The pen may be a passive pen not having a signal transmitting/receiving function or an active pen having a signal transmitting/receiving function. The touch driving circuit TDC can supply a touch driving signal to the touch panel TSP and sense the touch panel TSP. The touch controller TCTR may sense a touch using the sensing result of the touch panel TSP from the touch driving circuit TDC. Here, "senses a touch" means that whether a touch has been made and/or a touch coordinate is determined.

The touch panel TSP may be an outer-mounted type in which it is disposed outside the display panel DISP or an embedded type in which it is disposed inside the display panel DISP.

When the touch panel TSP is an outer-mounted type, the touch panel TSP and the display panel DISP may be separately manufactured and then be coupled to each other by an adhesive or the like. The outer-mounted touch panel TSP is also referred to as an Add-on type.

When the touch panel TSP is an embedded type, the touch panel TSP can be manufactured together in the process of manufacturing the display panel DISP. That is, touch sensors constituting the touch panel TSP can be disposed in the display panel DISP. The embedded type touch panel TSP may be an In-cell type, an On-cell type, a hybrid type, or the like.

On the other hand, for the purpose of convenience of explanation, it is assumed in the following description that the touch panel TSP is an embedded type in which it is disposed inside the display panel DISP.

When the touch panel TSP is embedded in the display panel DISP, that is, when a plurality of touch electrodes TE are arranged in the display panel DISP, the plurality of touch electrodes TE may be disposed in the display panel DISP separately from electrodes which are used for display driving or the electrodes which are disposed in the display panel DISP for display driving may be used as the plurality of touch electrodes TE.

For example, the common electrode disposed in the display panel DISP may be divided into a plurality of parts and may be used as the plurality of touch electrodes TE. That is, the plurality of touch electrodes TE disposed in the display panel DISP may be electrodes for touch sensing and may be electrodes for display driving. In the following description, it is assumed that the plurality of touch electrodes TE disposed in the display panel DISP are common electrodes.

The touch controller TCTR may be realized, for example, by a micro control unit MCU or a processor.

The display controller DCTR and the touch controller TCTR may be separately embodied or may be integrally embodied.

Referring to FIG. 3, a plurality of touch electrodes TE are arranged in the touch panel TSP of the touch display device and a plurality of touch lines TL that electrically connect the plurality of touch electrodes TE to the touch driving circuit TDC are disposed therein. One or more touch lines TL can be electrically connected to each touch electrode TE via one or more contact holes.

The touch display device can sense a touch based on self-capacitance of the touch electrodes TE or sense a touch based on mutual-capacitance between the touch electrodes TE.

When the touch display device senses a touch based on mutual-capacitance, a plurality of first touch electrode lines and a plurality of second touch electrode lines can be arranged to cross each other. For example, the plurality of first touch electrode lines can be arranged in an X-axis direction and the plurality of second touch electrode lines can be arranged in a Y-axis direction. Here, each of the first touch electrode line and the second touch electrode line may be a single touch electrode with a bar shape or may have a shape in which two or more touch electrodes are electrically connected to each other. The first touch electrode lines can be referred to as driving lines, driving electrodes, driving touch electrode lines, Tx lines, Tx electrodes, or Tx touch electrode lines. The second touch electrode lines can be referred to as receiving lines, receiving electrodes, receiving touch electrode lines, sensing lines, sensing electrodes, sensing touch electrode lines, Rx lines, Rx electrodes, or Rx touch electrode lines.

In this case, the touch driving circuit TDC can supply a driving signal to one or more of the plurality of first touch electrode lines, sense the second touch electrode lines, and output sensing data. The touch controller TCTR can calculate whether there is a touch and/or a touch coordinate using the sensing data.

When the touch display device senses a touch based on self-capacitance, a plurality of touch electrodes TE can be separately arranged in the touch panel TSP as illustrated in FIG. 3.

In this case, the touch driving circuit TDC can supply a driving signal (hereinafter referred to as a touch electrode driving signal TDS) to all or some of the plurality of touch electrodes TE, sense one or more touch electrodes TE to which the driving signal has been supplied, and output sensing data. The touch controller TCTR can calculate whether there is a touch and/or a touch coordinate using the sensing data.

In the following description, for the purpose of convenience of explanation, it is assumed that the touch display device senses a touch based on self-capacitance and that the touch panel TSP is configured as illustrated in FIGS. 2 and 3.

A touch electrode driving signal TDS which is output from the touch driving circuit TDC may be a signal of a constant voltage or may be a signal of a variable voltage.

When the touch electrode driving signal TDS is a signal of a variable voltage, the touch electrode driving signal TDS may have various signal waveforms such as a sinusoidal waveform, a triangular waveform, or a rectangular waveform.

In the following description, it is assumed that, when the touch electrode driving signal TDS is a signal of a variable voltage, the touch electrode driving signal TDS is a pulse signal including two or more pulses. When the touch electrode driving signal TDS is a pulse signal including two or more pulses, the touch electrode driving signal TDS may have a constant frequency or may have a variable frequency.

Referring to FIGS. 2 and 3, the size of an area which is occupied by one touch electrode TE may correspond to the size of an area which is occupied by one subpixel SP or may correspond to the size of an area which is occupied by two or more subpixels SP. That is, each of the plurality of touch electrodes TE may overlap two or more subpixels SP.

When it is assumed that a plurality of touch electrodes TE are arranged in a matrix and a first touch electrode and a second touch electrode of the plurality of touch electrodes TE are disposed in the same column (or the same row), two or more data lines DL overlapping the first touch electrode may overlap the second touch electrode. Two or more gate lines GL overlapping the first touch electrode do not overlap the second touch electrode.

A plurality of touch electrode columns (or touch electrode rows) may be disposed to be parallel to a plurality of data lines DL. A plurality of touch lines TL may be disposed to be parallel to a plurality of data lines DL.

A plurality of touch electrodes TE are arranged in one touch electrode column (or touch electrode row), and a plurality of touch lines TL electrically connected to a plurality of touch electrodes TE may overlap a plurality of touch electrodes TE.

For example, when it is assumed that a plurality of touch electrodes TE arranged in one touch electrode column includes a first touch electrode and a second touch electrode, a first touch line electrically connects the first touch electrode to the touch driving circuit TDC, and a second touch line electrically connects the second touch electrode to the touch driving circuit TDC, the first touch line connected to the first touch electrode can overlap the second touch electrode (the touch electrode disposed in the same column as the first touch electrode) but be electrically isolated from the second touch electrode in the display panel DISP. On the other hand, the first touch line and the second touch line may be short-circuited depending on a driving situation or if necessary in the touch driving circuit TDC.

Figure 4:
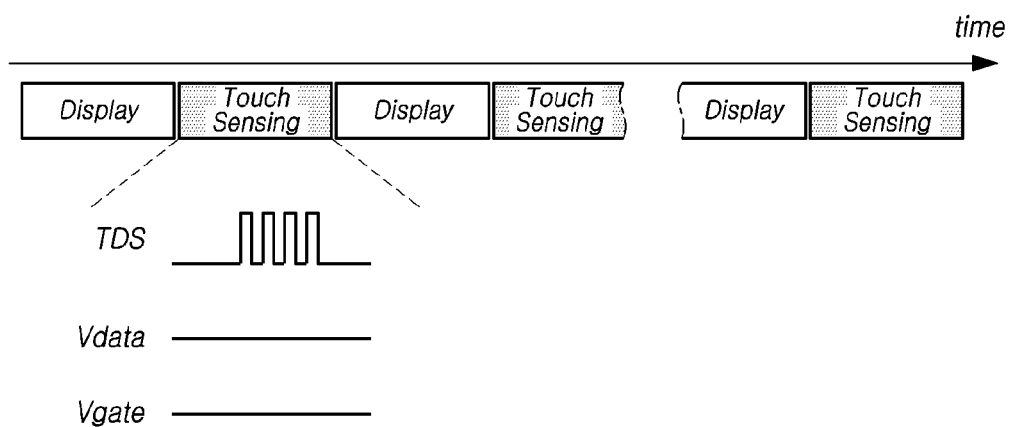
FIGS. 4 and 5 are diagrams illustrating a time-division driving system of the touch display device according to one embodiment.
Figure 5:
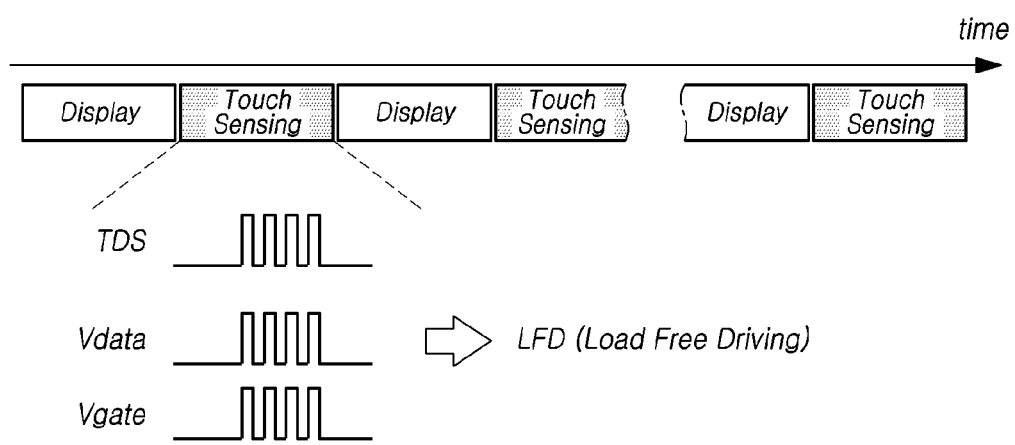

FIGS. 4 and 5 are diagrams illustrating a time-division driving (TDD) system of the touch display device according to one embodiment.

Referring to FIG. 4, the touch display device can alternately perform display and touch sensing. In this way, a system in which display driving for display and touch driving for touch sensing are alternately performed is referred to as a time-division driving system.

In the time-division driving system, a display period for display and a touch sensing period for touch sensing alternate. The touch display device can perform display driving in the display period. The touch display device can perform touch driving in the touch sensing period.

In an example of the time-division driving system, one frame time can be divided into a display period and a touch sensing period. In another example of the time-division driving system, one frame time can be divided into two or more display periods and one or two or more touch sensing periods.

Referring to FIG. 4, in the time-division driving system, the touch electrode driving signal TDS can be applied to one or more of the plurality of touch electrodes TE. At this time, the plurality of data lines DL and the plurality of gate lines GL may not be driven.

In this case, unnecessary parasitic capacitance due to a potential difference can be formed between a touch electrode TE to which the touch electrode driving signal TDS is applied and one or more data lines DL located in the vicinity thereof. This unnecessary parasitic capacitance can increase an RC delay between the corresponding touch electrode TE and the touch line TL connected thereto so that touch sensitivity may decrease.

In this case, unnecessary parasitic capacitance due to a potential difference can be formed between a touch electrode TE to which the touch electrode driving signal TDS is applied and one or more gate lines GL located in the vicinity thereof. This unnecessary parasitic capacitance can increase an RC delay between the corresponding touch electrode TE and the touch line TL connected thereto so that touch sensitivity may decrease.

In this case, unnecessary parasitic capacitance due to a potential difference can be formed between a touch electrode TE to which the touch electrode driving signal TDS is applied and one or more other touch electrodes TE located in the vicinity thereof. This unnecessary parasitic capacitance can increase an RC delay between the corresponding touch electrode TE and the touch line TL connected thereto so that touch sensitivity may decrease.

The above-mentioned RC delay is referred to as a time constant or a load.

To remove the load, the touch display device can perform load-free driving LFD in the touch sensing period.

Referring to FIG. 5, in the touch display device, when the touch electrode driving signal TDS is applied to all or some of the plurality of touch electrodes TE at the time of load-free driving, a load-free driving signal can be applied as a data signal Vdata to all the data lines DL or some data lines DL for which there is a likelihood that parasitic capacitance will be formed.

Referring to FIG. 5, in the touch display device, when the touch electrode driving signal TDS is applied to all or some of the plurality of touch electrodes TE at the time of load-free driving, a load-free driving signal can be applied as a gate signal Vgate to all the gate lines GL or some gate lines GL for which there is a likelihood that parasitic capacitance will be formed.

In the touch display device, when the touch electrode driving signal TDS is applied to some of the plurality of touch electrodes TE at the time of load-free driving, a load-free driving signal can be applied to all the touch electrodes or some other touch electrodes TE for which there is a likelihood that parasitic capacitance will be formed (not shown in FIG. 5).

The load-free driving signal may be a touch electrode driving signal or may be a signal having signal characteristics equal or similar to those of the touch electrode driving signal. For example, the frequency and the phase of the load-free driving signal may be completely equal to the frequency and the phase of the touch electrode driving signal TDS or may be equal thereto within a predetermined error range. The amplitude of the load-free driving signal and the amplitude of the touch electrode driving signal TDS may be completely equal or may be equal within a predetermined error range, and may have an intentional difference in some cases.

Figure 6:
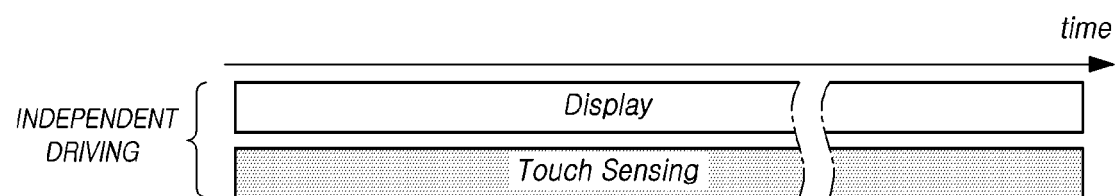
FIG. 6 is a diagram illustrating a time-free driving system of the touch display device according to one embodiment.

FIG. 6 is a diagram illustrating a time-free driving (TFD) system of the touch display device according to one embodiment.

Referring to FIG. 6, the touch display device can independently perform display and touch sensing. In this way, a driving system in which display driving for display and touch driving for touch sensing are independently performed is referred to as a time-free driving system.

In the time-free driving system, display driving for display and touch driving for touch sensing may be simultaneously performed. In a certain period, only display driving for display can be performed or only touch driving for touch sensing can be performed.

Figure 7:
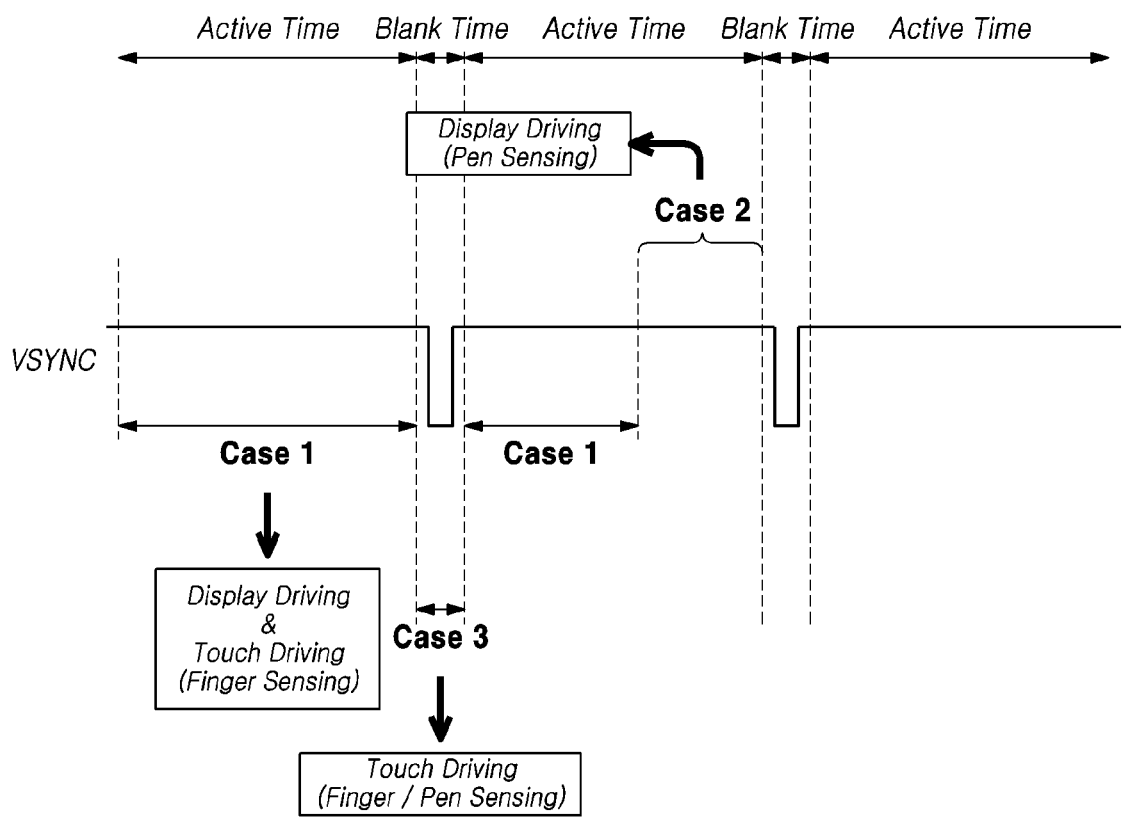
FIG. 7 is a diagram illustrating three cases of time-free driving in the touch display device according to one embodiment.
Figure 8:
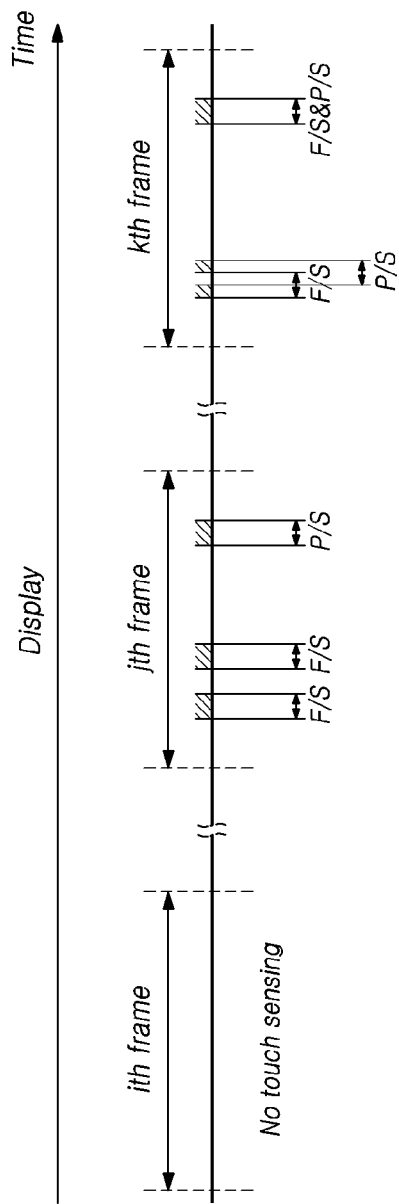
FIG. 8 is a diagram illustrating various timings for finger sensing and pen sensing based on a time-free driving system in the touch display device according to one embodiment.

FIG. 7 is a diagram illustrating three cases (Cases 1, 2, and 3) of time-free driving when the touch display device performs time-free driving according to one embodiment. FIG. 8 is a diagram illustrating various timings for finger sensing (F/S) and pen sensing (P/S) based on the time-free driving system in the touch display device according to one embodiment. FIG. 9 is a diagram illustrating touch electrode driving signals TDS in three cases (Cases 1, 2, and 3) of the time-free driving in the touch display device according to one embodiment.

In Case 1 of time-free driving, the touch display device can simultaneously perform display driving and touch driving. In this case, while display driving is being performed by supplying a data signal Vdata for displaying an image to a plurality of data lines DL from the data driving circuit DDC, the touch driving circuit TDC can sense at least one of a plurality of touch electrodes TE In Case 1, the touch display device can supply a touch electrode driving signal TDS of a variable voltage to the touch electrodes TE to perform touch driving.

In the following description, the touch electrode driving signal TDS which is applied to the touch electrodes TE in Case 1 is referred to as a first touch electrode driving signal TDS1. The first touch electrode driving signal TDS1 has a first amplitude AMP1.

In Case 1, the touch display device can perform touch driving and sense a touch of a finger with the touch panel TSP. This touch sensing is referred to as finger sensing.

Alternatively, in Case 1, the touch display device can perform touch driving and sense a touch of a finger or a pen when the finger or the pen does not touch the touch panel TSP but approaches the touch panel TSP. This touch sensing is referred to as hover sensing.

In Case 2 of time-free driving, the touch display device can perform only display driving.

In Case 2, since the touch display device does not need to sense a touch of a finger, the touch display device does not perform general touch driving. That is, the touch display device does not supply the touch electrode driving signal TDS of a variable voltage to the plurality of touch electrodes TE which are disposed in the touch panel TSP.

In Case 2, the touch display device can supply the touch electrode driving signal TDS of a DC voltage. In the following description, the touch electrode driving signal TDS which is applied to the touch electrodes TE in Case 2 is referred to as a second touch electrode driving signal TDS2.

On the other hand, in Case 2, the touch display device can receive a pen signal output from a pen and sense the pen. The touch display device can acquire a result of pen sensing, a position, a tilt, and a pressure (a pen pressure) of a pen, or various additional information.

In Case 3 of time-free driving, the touch display device can perform only touch driving.

In Case 3, the touch display device can supply a touch electrode driving signal TDS of a variable voltage to the touch electrodes TE for the purpose of touch driving.

In the following description, the touch electrode driving signal TDS which is applied to the touch electrodes TE in Case 3 is referred to as a third touch electrode driving signal TDS3. The third touch electrode driving signal TDS3 has a third amplitude AMPS which is different from the first amplitude AMP1.

In Case 3, the touch display device can sense a touch of a finger with the touch panel TSP by performing touch driving.

Referring to FIG. 7, among three cases (Cases 1, 2, and 3) of time-free driving in the touch display device, Case 1 can be carried out in an active time and Case 3 can be carried out in a blank time. Here, an active time corresponds to a time in which a screen of one frame is displayed and a blank time corresponds to a time required until a screen of a next frame is displayed after a screen of one frame has been displayed.

Referring to FIG. 7, Case 1 can be switched to Case 2 in the active time.

Referring to FIG. 7, in the active time, the touch display device can stop touch driving for finger sensing while simultaneously carrying out display driving and touch driving (Case 1 is carried out) (that is, Case 1 is switched to Case 2).

In Cases 1 and 3, touch electrode driving signals TDS1 and TDS3 having amplitudes AMP1 and AMP3 can be applied to the touch electrodes TE at the time of touch driving for finger sensing.

In Case 2, a touch electrode driving signal TDS2 of a DC voltage can be applied to the touch electrodes TE for the purpose of pen sensing.

On the other hand, referring to FIG. 9, the first amplitude AMP1 of the first touch electrode driving signal TDS1 which is applied to the touch electrodes TE when display driving and touch driving are simultaneously performed (Case 1) can be less than the third amplitude AMP3 of the third touch electrode driving signal TDS3 which is applied to the touch electrodes TE when only touch driving is performed (Case 3).

The first amplitude AMP1 of the first touch electrode driving signal TDS1 which is applied to the touch electrodes TE in the active time can be less than the third amplitude AMP3 of the third touch electrode driving signal TDS3 which is applied to the touch electrodes TE in the blank time.

Referring to FIGS. 7 and 9, in the active time, the touch driving circuit TDC can supply the first touch electrode driving signal TDS1 having the first amplitude AMP1 or the second touch electrode driving signal TDS2 having a DC voltage to the plurality of touch electrodes TE.

Referring to FIGS. 7 and 9, in the blank time, the touch driving circuit TDC can supply the third touch electrode driving signal TDS3 having the third amplitude AMP3 to one or more of the plurality of touch electrodes TE.

On the other hand, driving corresponding to Case 1 may be performed in one frame or may be performed in only a partial time interval of one frame. Driving corresponding to Case 2 may be performed in all frames or some frames or may be performed in only a partial time interval of one frame. At the time of driving corresponding to Case 3, driving for finger sensing may be performed or driving for pen sensing may be performed.

Referring to FIG. 8, in the time-free driving system of the touch display device, finger sensing F/S and pen sensing P/S can be performed at various timings.

For example, as in the i-th frame, only display driving for display may be performed without performing finger sensing F/S and pen sensing P/S in one frame. This corresponds to Case 2 in which pen sensing P/S is not performed.

As in the j-th frame, finger sensing F/S may be performed in only a partial time interval necessary in one frame time. This corresponds to Case 1. Pen sensing P/S may be performed in only a partial time interval necessary in one frame time. This corresponds to Case 2. In one frame, finger sensing F/S and pen sensing P/S may be performed in partial time intervals which do not overlap in one frame time.

As in the k-th frame, finger sensing F/S and pen sensing P/S may be performed in time intervals overlapping in one frame. In this case, the sensing results of finger sensing F/S and pen sensing P/S can be distinguished by a predetermined algorithm or signal analysis based on a sensing position using the touch controller TCTR or the like.

In addition to the above-mentioned examples, display and touch sensing (finger sensing and/or pen sensing) can be independently performed at various timings.

Figure 10:
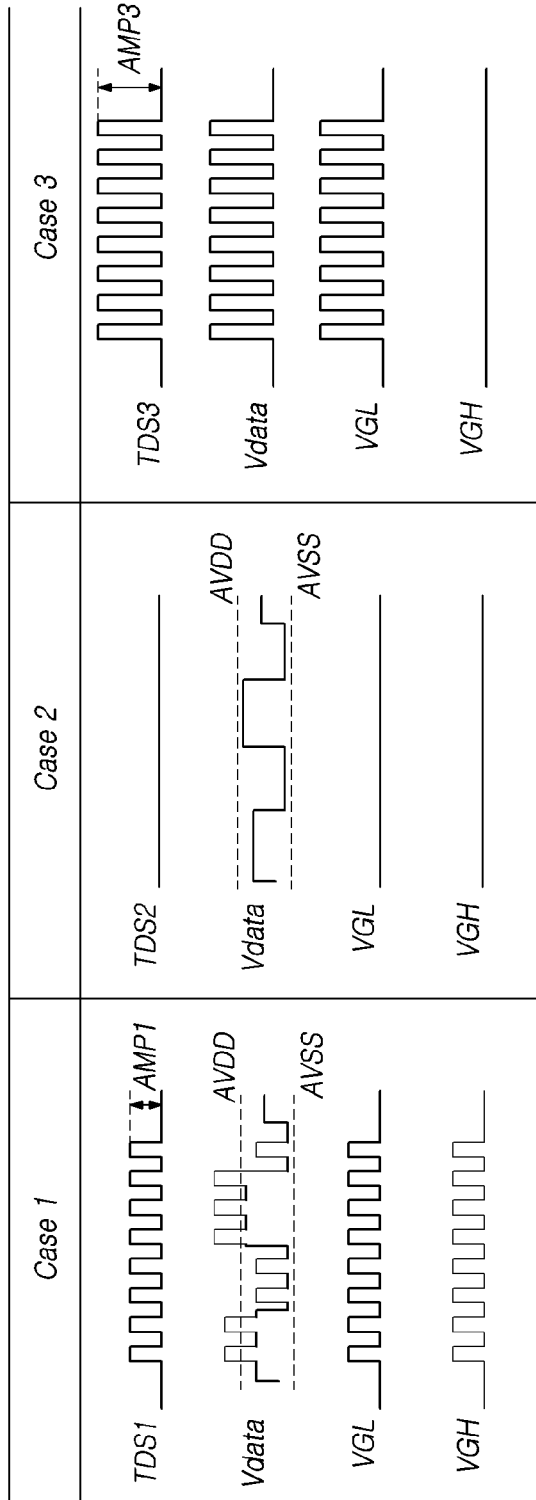
FIG. 10 is a diagram illustrating waveforms of principal signals in three cases of time-free driving in the touch display device according to one embodiment.

FIG. 10 is a diagram illustrating waveforms of principal signals TDS1, Vdata, VGL_M, and VGH_M in three cases (Case 1, Case 2, and Case 3) of time-free driving in the touch display device according to one embodiment.

Cases 1 and 2 are cases of driving in an active time. Case 3 is a case of driving in a blank time.

In the three cases, a touch electrode driving signal TDS is applied to the touch electrodes TE, a data signal Vdata is supplied to the data lines DL, and an OFF-level gate voltage VGL_M and an ON-level gate voltage VGH_M are supplied to the gate driving circuit GDC to generate a scan signal which is supplied to the gate lines GL.

In Case 2 in which only display driving is performed in the active time, the touch electrode driving signal TDS which is applied to the touch electrodes TE is a second touch electrode driving signal TDS2 of a DC voltage.

The data signal Vdata which is applied to the data lines DL is a signal corresponding to an image analog signal into which an image digital signal is converted in a digital-analog conversion manner for the purpose of display and may be a pixel voltage which is applied to a pixel electrode of the corresponding subpixel SP via the corresponding data line DL. The data signal Vdata can swing between a drive voltage AVDD, which may be a high-level voltage, and a base voltage AVSS, which may be a low-level voltage.

The OFF-level gate voltage VGL_M and the ON-level gate voltage VGH_M constituting the scan signal Vgate which is applied to the gate lines GL are DC voltages.

As described above, the touch electrodes TE can also serve as a common electrode for display driving. Accordingly, in Case 2 in which only display driving is performed in the active time, the second touch electrode driving signal TDS2 which is applied to the touch electrodes TE corresponds to a common voltage for display.

Accordingly, in the corresponding subpixel SP, an electric field is formed between the pixel electrode and the touch electrode TE due to a voltage difference between the data signal Vdata which is applied to the pixel electrode via the data line DL and the second touch electrode driving signal TDS2 corresponding to the common voltage which is applied to the touch electrode TE, and thus desired light can be emitted from the subpixel SP.

In Case 3 in which only touch driving is performed in the blank time, the touch electrode driving signal TDS which is applied to the touch electrodes TE is a third touch electrode driving signal TDS3 having the third amplitude AMPS.

In the blank time, the data lines DL conventionally may be supplied with a data signal corresponding to a DC voltage or may be in a floating state. In the blank time, the gate lines GL conventionally may be supplied with a scan signal of an OFF-level gate voltage corresponding to a DC voltage or may be in an electrical floating state.

When load-free driving is performed in the blank time in which only touch driving is performed, the data lines DL and the gate lines GL can swing in the same way as the touch electrodes TE from the viewpoint of voltage characteristics.

The data signal Vdata which is applied to the data lines DL in the blank time in accordance with load-free driving may be the third touch electrode driving signal TDS3 or a load-free driving signal having signal characteristics (for example, a phase, a frequency, and an amplitude) equal or similar to those of the third touch electrode driving signal TDS3.

The OFF-level gate voltage VGL_M which is applied to the gate lines GL in the blank time in accordance with load-free driving may be the third touch electrode driving signal TDS3 or a load-free driving signal having signal characteristics (for example, a phase, a frequency, and an amplitude) equal or similar to those of the third touch electrode driving signal TDS3.

In Case 1 in which display driving and touch driving are simultaneously performed in the active time, the touch electrode driving signal TDS which is applied to the touch electrodes TE is a first touch electrode driving signal TDS1 having the first amplitude AMP1.

In Case 1, since display driving and touch driving are simultaneously performed in the active time, the first touch electrode driving signal TDS1 is a touch driving signal for touch sensing and also serves as a display common voltage Vcom for forming capacitance with a data signal Vdata.

The first touch electrode driving signal TDS1 which is applied to the touch electrodes TE should have a predetermined voltage difference for display from the data signal Vdata corresponding to a pixel voltage for display.

In Case 1 in which display driving and touch driving are simultaneously performed, the first touch electrode driving signal TDS1 performs two functions (a driving signal for touch sensing and a common voltage for display).

As described above, since the common voltage Vcom corresponding to the first touch electrode driving signal TDS1 is not a fixed voltage but a variable voltage, the data signal Vdata which is applied to the data lines DL should be subjected to an additional voltage variation of the first amplitude AMP1 of the first touch electrode driving signal TDS1 in addition to the original voltage variation for display in order to reduce the data lines DL from being affected by touch driving.

Accordingly, in the voltage difference between the data signal Vdata corresponding to the pixel voltage and the first touch electrode driving signal TDS1 corresponding to the common voltage Vcom, a voltage variation part (that is, the first amplitude AMP1) of the first touch electrode driving signal TDS1 is excluded and only the original voltage variation for display is left. Accordingly, normal display can be performed.

Accordingly, the data signal Vdata in Case 1 in which display driving and touch driving are simultaneously performed may have a signal pattern in which the first touch electrode driving signal TDS1 and the data signal Vdata in the case (Case 2) in which only display driving is performed are combined.

In other words, the data signal Vdata in Case 1 in which display driving and touch driving are simultaneously performed may have a signal pattern which is obtained by offsetting the original data signal Vdata in the case (Case 2) in which only display driving is performed using the first touch electrode driving signal TDS1. Here, the data signal Vdata may be subjected to a large voltage variation between the drive voltage AVDD and the base voltage AVSS.

Accordingly, the voltage difference between the data signal Vdata and the first touch electrode driving signal TDS1 in Case 1 in which display driving and touch driving are simultaneously performed is the same as a voltage difference between the data signal Vdata and the second touch electrode driving signal TDS2 in Case 2 in which only display driving is performed.

In Case 1, since display driving and touch driving are simultaneously performed, load-free driving may be required.

That is, in Case 1, since display driving and touch driving are simultaneously performed, it may be necessary to reduce parasitic capacitance from being formed between the touch electrodes TE and the data lines DL due to touch driving and to reduce parasitic capacitance from being formed between the touch electrodes TE and the gate lines GL due to touch driving.

As described above, in Case 1, since the voltages of the touch electrodes TE and the data lines DL fluctuate with a voltage variation of the first touch electrode driving signal TDS1, only a voltage difference for display is present between the touch electrodes TE and the data lines DL and unnecessary parasitic capacitance due to touch driving is not formed. That is, in Case 1, load-free driving for the data lines DL is necessarily performed.

In Case 1, the OFF-level gate voltage VGL_M and the ON-level gate voltage VGH_M which are supplied to the gate driving circuit GDC such that the gate driving circuit GDC can generate a scan signal SCAN which is applied to the gate lines GL may be load-free driving signals having signal characteristics (for example, a phase, a frequency, and an amplitude) equal or similar to those of the third touch electrode driving signal TDS3.

In Case 1, the data signal Vdata may be a signal which is modulated on the basis of the first touch electrode driving signal TDS1. The scan signal Vgate may be a signal which is modulated on the basis of the first touch electrode driving signal TDS1.

The above-mentioned time-free driving of the touch display device will be described below in more detail.

Figure 11:
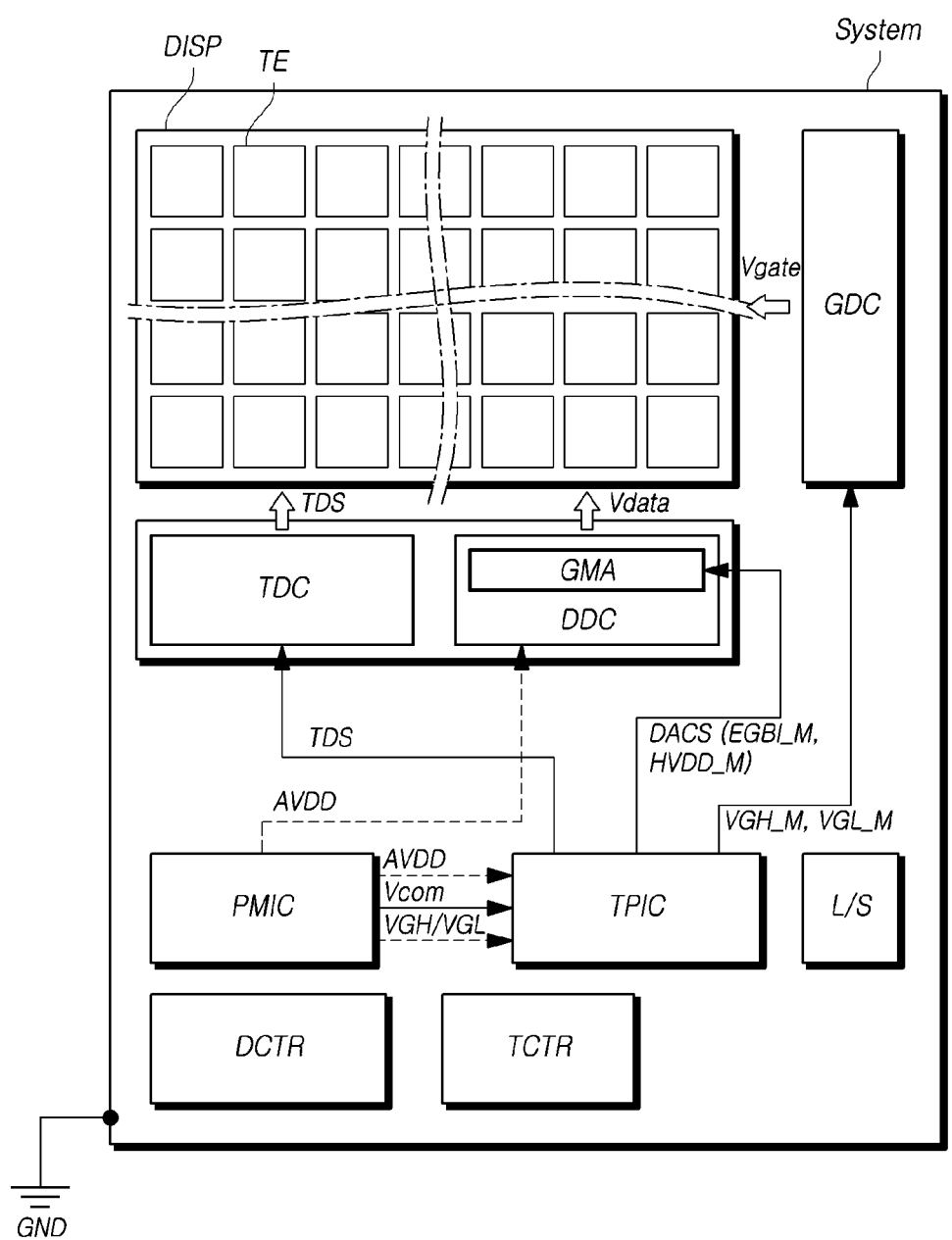
FIG. 11 is a diagram illustrating a time-free driving system in the touch display device according to one embodiment.

FIG. 11 is a diagram illustrating a time-free driving system in the touch display device according to one embodiment.

Referring to FIG. 11, the touch display device includes a display panel DISP in which a plurality of data lines DL and a plurality of gate lines GL are arranged and a plurality of touch electrodes TE are arranged, a gate driving circuit GDC that is able to be electrically connected to the plurality of gate lines GL and drives the plurality of gate lines GL, a data driving circuit DDC that is able to be electrically connected to the plurality of data lines DL and drives the plurality of data lines DL, and a touch driving circuit TDC that is able to be electrically connected to the plurality of touch electrodes TE and drives the plurality of touch electrodes TE.

The touch display device may further include a display controller DCTR that controls driving operations of the data driving circuit DDC and the gate driving circuit GDC and a touch controller TCTR that controls a driving operation of the touch driving circuit TDC or calculates whether there is a touch and/or touch coordinates using sensing data which is output from the touch driving circuit TDC.

The touch display device may further include a touch power circuit TPIC and a power management circuit PMIC for supplying power.

The touch power circuit TPIC can supply an ON-level gate voltage VGH_M and an OFF-level gate voltage VGL_M which are required for driving the gate lines GL to the gate driving circuit GDC.

The touch power circuit TPIC can supply a touch electrode driving signal TDS which is required for driving the touch electrodes TE to the touch driving circuit TDC.

On the other hand, in view of a driving entity for the touch electrodes TE, the touch driving circuit TDC can supply touch electrode driving signals TDS1 and TDS3 for touch sensing to the touch electrodes TE which are to be sensed among the plurality of touch electrodes TE on the basis of a modulated signal (for example, a pulse width modulated signal) received from the touch controller TCTR. The touch power circuit TPIC can also supply the modulated signal (for example, a pulse width modulated signal) received from the touch controller TCTR as a load-free driving signal (a type of touch electrode driving signal) to the touch electrodes TE which are not to be sensed among the plurality of touch electrodes TE. Here, the touch electrode driving signals TDS1 and TDS2 applied to the touch electrodes TE which are to be sensed and the load-free driving signal (which can be also considered to be a touch electrode driving signal) applied to the touch electrodes TE which are not to be sensed may be the same signal.

The power management circuit PMIC can supply various DC voltages (such as AVDD, Vcom, VGH, and VGL) required for supply of signals from the touch power circuit TPIC to the touch power circuit TPIC.

The power management circuit PMIC can supply various DC voltages (such as AVDD and AVSS) required for data driving in the data driving circuit DDC to the data driving circuit DDC.

The touch controller TCTR can supply pulse width modulated (PWM) signals for outputting or generating various signals (for example, TDS) in circuits such as the touch power circuit TPIC, the touch driving circuit TDC, and the data driving circuit DDC. The touch controller TCTR can be embodied by, for example, a micro control unit (MCU) or a processor.

The touch display device may further include one or more level shifters L/S that change voltage levels of various signals.

The one or more level shifters L/S may be embodied separately from the data driving circuit DDC, the gate driving circuit GDC, the touch driving circuit TDC, the touch power circuit TPIC, the power management circuit PMIC, the display controller DCTR, and the touch controller TCTR or may be included as one or more internal modules in the data driving circuit DDC, the gate driving circuit GDC, the touch driving circuit TDC, the touch power circuit TPIC, the power management circuit PMIC, the display controller DCTR, and the touch controller TCTR.

Referring to FIG. 11, the data driving circuit DDC may include a gamma block GMA that converts an image digital signal input from the display controller DCTR or the like into an image analog signal.

Referring to FIG. 11, the touch power circuit TPIC is configured to supply a D/A conversion control signal DACS required for converting an image digital signal into an image analog signal to the gamma block GMA in the data driving circuit DDC.

The D/A conversion control signal DACS can include, for example, a gamma reference voltage EGBI_M and may further include a half drive voltage HVDD_M, which is a drive voltage of a middle level between the drive voltage AVDD (which is a high-level voltage) and the base voltage AVSS (which is a low-level voltage).

The gamma reference voltage EGBI_M which is a D/A conversion control signal DACS can include a high gamma reference voltage and a low gamma reference voltage which are input to both ends of a resistor string in the gamma block GMA.

The half drive voltage HVDD_M which is another D/A conversion control signal DACS may be a voltage which is substantially half the drive voltage AVDD.

As described above, the touch driving circuit TDC can output a first touch electrode driving signal TDS1 swinging with the first amplitude AMP1 to the plurality of touch electrodes TE, output a second touch electrode driving signal TDS2 corresponding to a DC voltage to the plurality of touch electrodes TE, or output a third touch electrode driving signal TDS3 swinging with the third amplitude AMPS to all or some of the plurality of touch electrodes TE.

Here, the first touch electrode driving signal TDS1 is a driving signal for touch sensing and corresponds to a common voltage Vcom for display. The second touch electrode driving signal TDS2 corresponds to the common voltage Vcom for display. The third touch electrode driving signal TDS3 corresponds to the driving signal for touch sensing.

In Case 1 in which display driving and touch driving are simultaneously performed, when the first touch electrode driving signal TDS1 is output to the plurality of touch electrodes TE, load-free driving for reducing unnecessary parasitic capacitance from being formed between the plurality of touch electrodes TE and the plurality of data lines DL is required.

For this purpose, the data driving circuit DDC can supply a data signal Vdata for generating the same voltage variation state as the voltage variation state of the touch electrodes TE due to the first touch electrode driving signal TDS1 in the data lines DL to the data lines DL.

For this load-free driving, the data driving circuit DDC can use a gamma modulation technique.

More specifically, the data driving circuit DDC can convert an image digital signal into an image analog signal in response to the gamma reference voltage EGBI_M of a modulated signal pattern swinging with a predetermined amplitude and output a data signal Vdata corresponding to the image analog signal to the data lines DL.

The data driving circuit DDC includes a digital-analog converter DAC that converts an image digital signal into an image analog signal in response to the gamma reference voltage EGBI_M of a modulated signal pattern swinging with a predetermined amplitude and an output buffer circuit that outputs a data signal Vdata corresponding to the image analog signal to the data lines DL.

The gamma reference voltage EGBI_M of a modulated signal pattern may be a signal which is applied to the touch electrodes TE and which is modulated in synchronization with the first touch electrode driving signal TDS1 swinging with the first amplitude AMP1.

The gamma reference voltage EGBI_M of a modulated signal pattern may have a frequency and a phase corresponding to those of the first touch electrode driving signal TDS1. In some cases, the gamma reference voltage EGBI_M may have an amplitude equal or similar to the first amplitude AMP1 of the first touch electrode driving signal TDS1.

The data signal Vdata which is generated on the basis of the gamma reference voltage EGBI_M of a modulated signal pattern may include a voltage variation part corresponding to the voltage variation of the first touch electrode driving signal TDS1.

For the gamma modulation technique of the data driving circuit DDC, the touch power circuit TPIC can output the gamma reference voltage EGBI_M having an amplitude corresponding to the first amplitude AMP1 of the first touch electrode driving signal TDS1 to the data driving circuit DDC at the driving timing corresponding to Case 1.

At the driving timing corresponding to Case 2, the touch power circuit TPIC can output the gamma reference voltage EGBI_M corresponding to a DC voltage to the data driving circuit DDC.

At the driving timing corresponding to Case 3, the touch power circuit TPIC does not supply any gamma reference voltage EGBI_M of any pattern to the data driving circuit DDC.

Referring to FIG. 11, in the touch display device, the display panel DISP, the data driving circuit DDC, the gate driving circuit GDC, the touch driving circuit TDC, and the like can be connected to a DC ground voltage GND.

Figure 12:
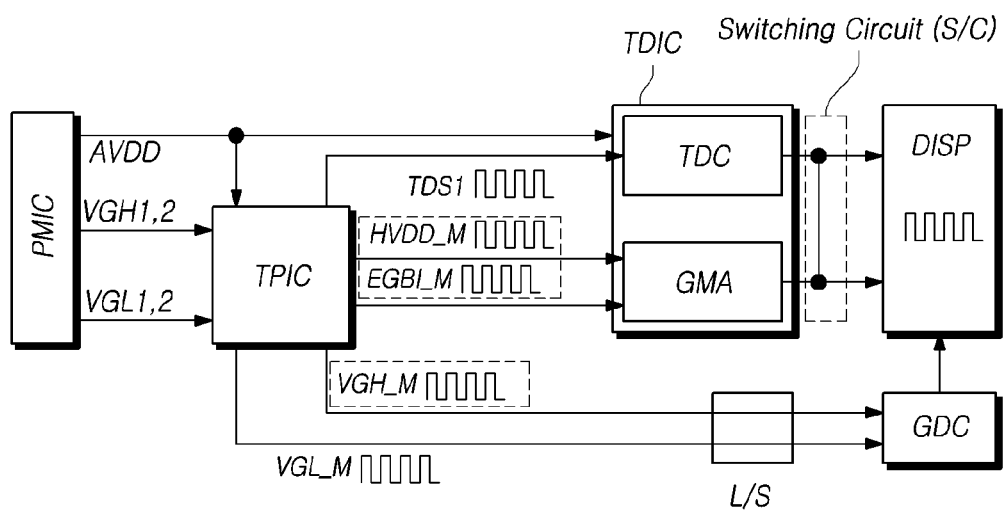
FIG. 12 is a diagram illustrating a signal transmission system between elements for Case 1 of three cases of time-free driving in the touch display device according to one embodiment.
Figure 13:
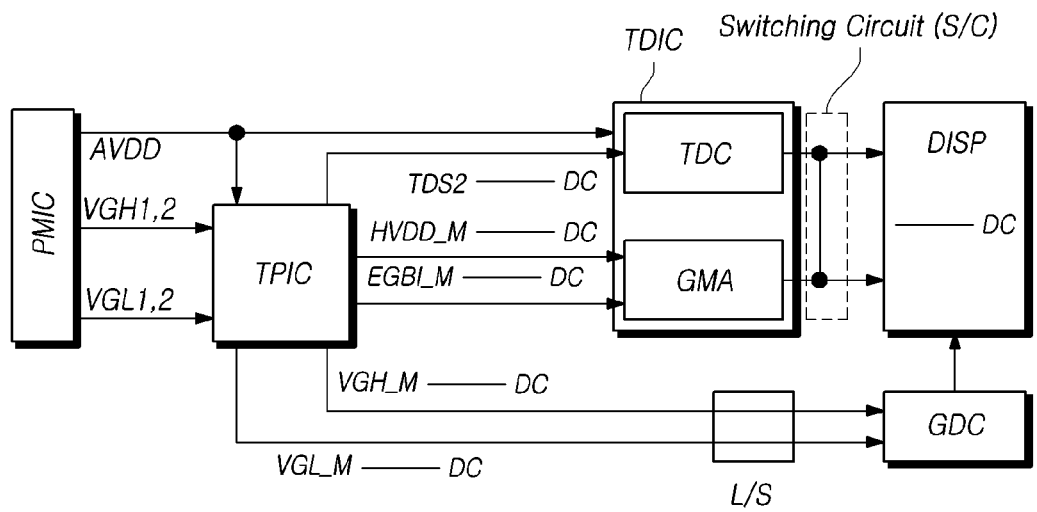
FIG. 13 is a diagram illustrating a signal transmission system between elements for Case 2 of three cases of time-free driving in the touch display device according to one embodiment.
Figure 14:
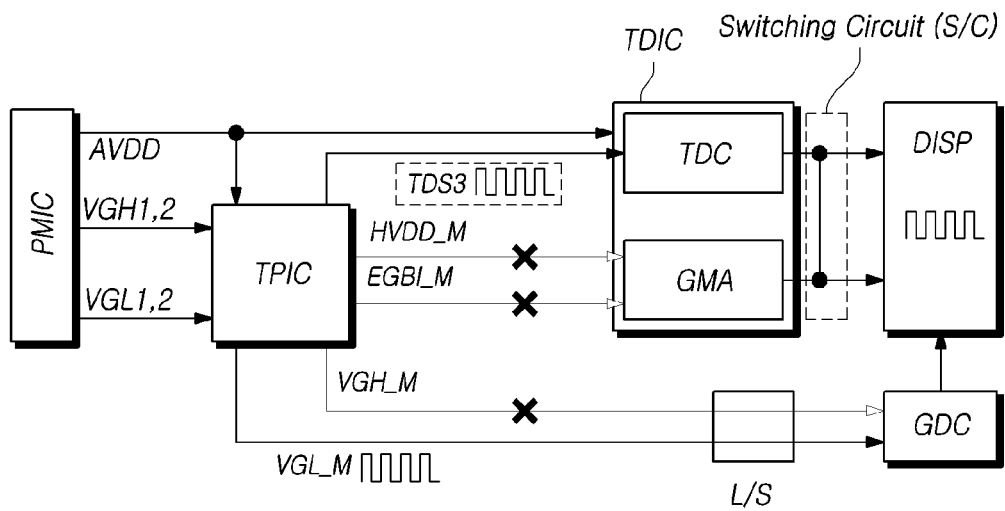
FIG. 14 is a diagram illustrating a signal transmission system between elements for Case 3 of three cases of time-free driving in the touch display device according to one embodiment.

FIGS. 12 to 14 are diagrams illustrating a signal transmission system between elements for the three cases of time-free driving in the touch display device. Here, it is assumed that the touch driving circuit TDC and the data driving circuit DDC are integrated as a single driving circuit TDIC.

Referring to FIGS. 12 to 14, the touch power circuit TPIC receives a drive voltage AVDD which is a DC voltage, ON-level gate voltages VGH1 and VGH2, and OFF-level gate voltages VGL1 and VGL2 from the power management circuit PMIC.

Referring to FIG. 12, when display driving and touch driving are simultaneously performed in the active time (Case 1), the touch power circuit TPIC can supply the first touch electrode driving signal TDS1 having the first amplitude AMP1 to the touch driving circuit TDC.

The touch power circuit TPIC can supply the half drive voltage HVDD_M and the gamma reference voltage EGBI_M which swing in synchronization with the first touch electrode driving signal TDS1 to the gamma block GMA of the data driving circuit DDC. Here, the half drive voltage HVDD_M and the gamma reference voltage EGBI_M may have a frequency and a phase corresponding to those of the first touch electrode driving signal TDS1.

The touch power circuit TPIC can supply an ON-level gate voltage VGH_M and an OFF-level gate voltage VGL_M which swing in synchronization with the first touch electrode driving signal TDS1 to the gate driving circuit GDC. Here, the ON-level gate voltage VGH_M and the OFF-level gate voltage VGL_M may have a frequency and a phase corresponding to those of the first touch electrode driving signal TDS1.

The ON-level gate voltage VGH_M and the OFF-level gate voltage VGL_M can be changed via the level shifter L/S and the changed voltages can be supplied to the gate driving circuit GDC by the level shifter L/S. The level shifter L/S is disposed outside the gate driving circuit GDC. Alternatively, the level shifter L/S may be disposed in the gate driving circuit GDC and change the ON-level gate voltage VGH_M and the OFF-level gate voltage VGL_M received from the touch power circuit TPIC.

The touch driving circuit TDC can output the first touch electrode driving signal TDS1 having the first amplitude AMP1 to the plurality of touch electrodes TE.

Here, the first touch electrode driving signal TDS1 serves as a driving signal for touch sensing and also serves as a common voltage Vcom for display.

The data driving circuit DDC can convert an image digital signal into an image analog signal in response to the gamma reference voltage EGBI_M having a frequency and a phase corresponding to those of the first touch electrode driving signal TDS1 and output a data signal Vdata corresponding to the image analog signal to the data lines DL.

When the first touch electrode driving signal TDS1 is output to the plurality of touch electrodes TE, the gate driving circuit GDC can supply a first OFF-level gate voltage VGL_M having a frequency and a phase corresponding to those of the first touch electrode driving signal TDS1 or supply a first ON-level gate voltage VGH_M which is offset by the first OFF-level gate voltage VGL_M to the gate lines GL.

In Case 1, the display panel DISP may have characteristics that a voltage swings.

Referring to FIG. 13, when only display driving is performed in the active time (Case 2), the touch power circuit TPIC can supply a second touch electrode driving signal TDS2 corresponding to a DC voltage to the touch driving circuit TDC.

The touch power circuit TPIC can supply the half drive voltage HVDD_M of a DC voltage pattern and the gamma reference voltage EGBI_M of a DC voltage pattern to the gamma block GMA of the data driving circuit DDC.

The touch power circuit TPIC can supply the ON-level gate voltage VGH_M and the OFF-level gate voltage VGL_M of a DC voltage pattern to the gate driving circuit GDC.

The voltage levels of the ON-level gate voltage VGH_M and the OFF-level gate voltage VGL_M of a DC voltage pattern can be changed via a level shifter L/S and the changed voltages can be supplied to the gate driving circuit GDC by the level shifter L/S. The level shifter L/S is disposed outside the gate driving circuit GDC. Alternatively, the level shifter L/S may be disposed in the gate driving circuit GDC and change the voltage levels of the ON-level gate voltage VGH_M and the OFF-level gate voltage VGL_M received from the touch power circuit TPIC.

The touch driving circuit TDC can supply the second touch electrode driving signal TDS2 of a DC voltage pattern to the plurality of touch electrodes TE.

Here, the second touch electrode driving signal TDS2 of a DC voltage pattern supplied to the plurality of touch electrodes TE may serve as a common voltage for display driving. Accordingly, the plurality of touch electrodes TE may serve as a common electrode.

The data driving circuit DDC can convert an image digital signal into an image analog signal in response to the gamma reference voltage EGBI_M and the half drive voltage HVDD_M corresponding to a DC voltage and output a data signal Vdata corresponding to the image analog signal to the data lines DL.

When the second touch electrode driving signal TDS2 is output to the plurality of touch electrodes TE, the gate driving circuit GDC can supply a second OFF-level gate voltage VGL_M which is a DC voltage to the gate lines GL or supply a second ON-level gate voltage VGH_M which is a DC voltage to the gate lines GL.

In Case 2, the display panel DISP can have DC voltage characteristics.

Referring to FIG. 14, when touch driving is performed in the blank time (Case 3), the touch power circuit TPIC can supply a third touch electrode driving signal TDS3 having the third amplitude AMPS to the touch driving circuit TDC.

Since display driving is not required in the blank time, the touch power circuit TPIC does not supply the half drive voltage HVDD_M and the gamma reference voltage EGBI_M to the gamma block GMA of the data driving circuit DDC. That is, since touch driving is performed but display driving is not performed in the blank time in Case 3 of time-free driving, the gamma reference voltage EGBI_M is not input to the data driving circuit DDC.

The touch power circuit TPIC can supply an OFF-level gate voltage VGL_M swinging in synchronization with the third touch electrode driving signal TDS3 to the gate driving circuit GDC. Here, the OFF-level gate voltage VGL_M has a frequency and a phase corresponding to those of the third touch electrode driving signal TDS3.

Since display driving is not required in the blank time, the touch power circuit TPIC does not output the ON-level gate voltage VGH_M.

A voltage level of the OFF-level gate voltage VGL_M can be changed via a level shifter L/S and the changed voltage can be supplied to the gate driving circuit GDC by the level shifter L/S. The level shifter L/S is disposed outside the gate driving circuit GDC. Alternatively, the level shifter L/S may be disposed in the gate driving circuit GDC and change the voltage level of the OFF-level gate voltage VGL_M received from the touch power circuit TPIC.

In the blank time, the touch driving circuit TDC can output a third touch electrode driving signal TDS3 having a third amplitude AMPS different from the first amplitude AMP1 to all or some of the plurality of touch electrodes TE.

Here, the third touch electrode driving signal TDS3 does not serve as a common voltage for display but serves as a driving signal for touch sensing.

The third touch electrode driving signal TDS3 which is output from the touch driving circuit TDC can be applied to all or some of the plurality of touch electrodes TE and also be applied to other electrodes (for example, other touch electrodes) or other lines (DL, GL) which are arranged in the display panel DISP for the purpose of load-free driving by a switching circuit S/C.

More specifically, in the blank time, the third touch electrode driving signal TDS3 or a signal corresponding to the third touch electrode driving signal TDS3 can be applied to all or some of the plurality of data lines DL. Here, the third touch electrode driving signal TDS3 or the signal corresponding to the third touch electrode driving signal TDS3 which is applied to all or some of the plurality of data lines DL is a load-free driving signal that can reduce parasitic capacitance from being formed between the corresponding touch electrode TE and the corresponding data line DL and remove a load (an RC delay) in the corresponding touch electrode TE and the corresponding touch line TL.

When the third touch electrode driving signal TDS3 is supplied to the plurality of touch electrodes TE, the gate driving circuit GDC can supply a third OFF-level gate voltage VGL_M having a frequency and a phase corresponding to those of the third touch electrode driving signal TDS3 to the gate lines GL.

In the blank time, the third touch electrode driving signal TDS3 or the signal (the third OFF-level gate voltage) corresponding to the third touch electrode driving signal TDS3 can be applied to all or some of the plurality of gate lines GL.

Here, the third touch electrode driving signal TDS3 or the signal corresponding to the third touch electrode driving signal TDS3 which is applied to all or some of the plurality of gate lines GL is a load-free driving signal that can reduce parasitic capacitance from being formed between the corresponding touch electrode TE and the corresponding gate line GL and remove a load (an RC delay) in the corresponding touch electrode TE and the corresponding touch line TL.

In Case 3, the display panel DISP can have characteristics that a voltage swings.

Case 1 in which display driving and touch driving are simultaneously performed among three cases of time-free driving (Case 1, Case 2, and Case 3) will be described below in more detail.

Figure 15:
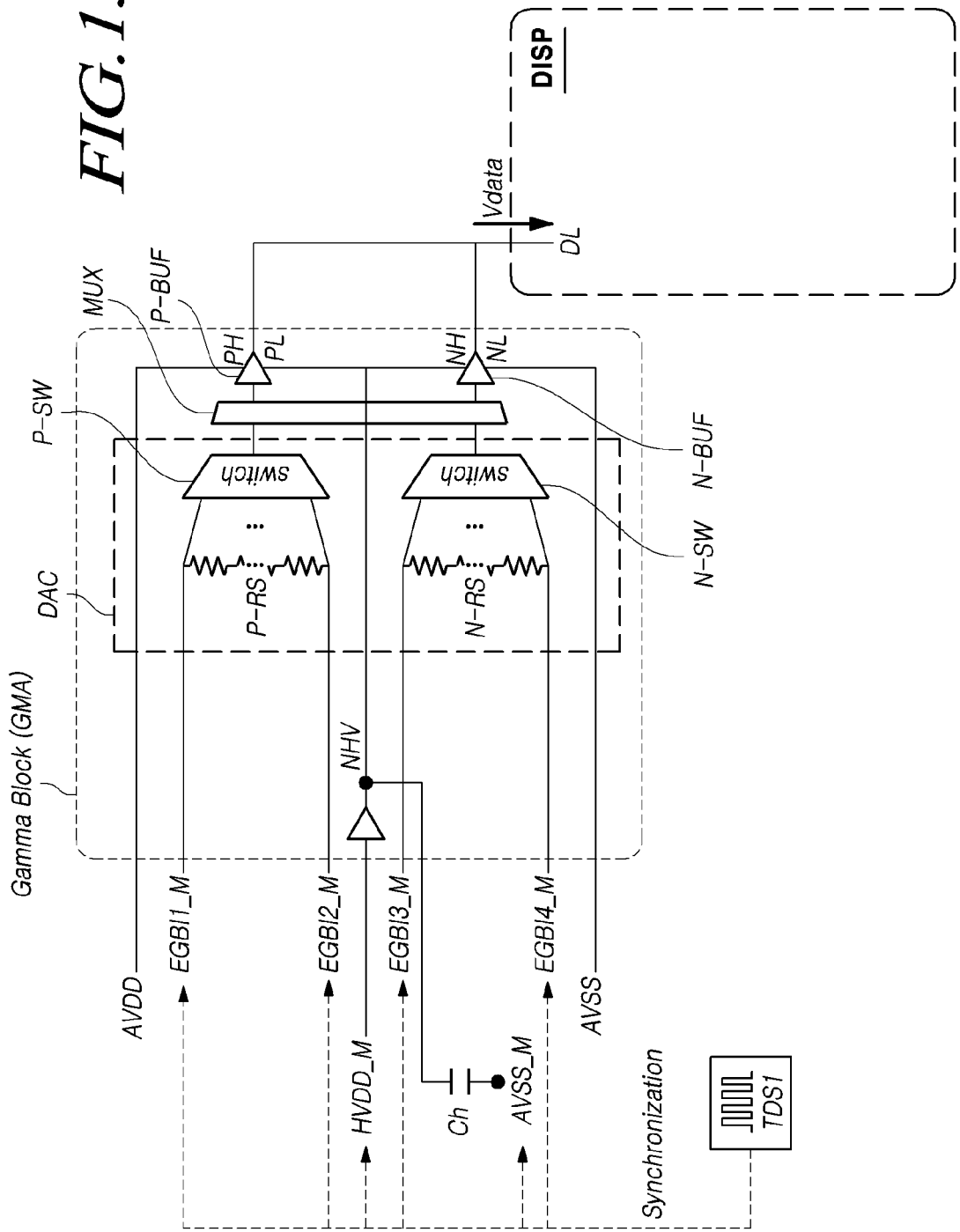
FIG. 15 is a diagram illustrating an example of a gamma block for performing time-free driving on data lines using a gamma modulation method in the time-free driving system of the touch display device according to one embodiment.
Figure 16:
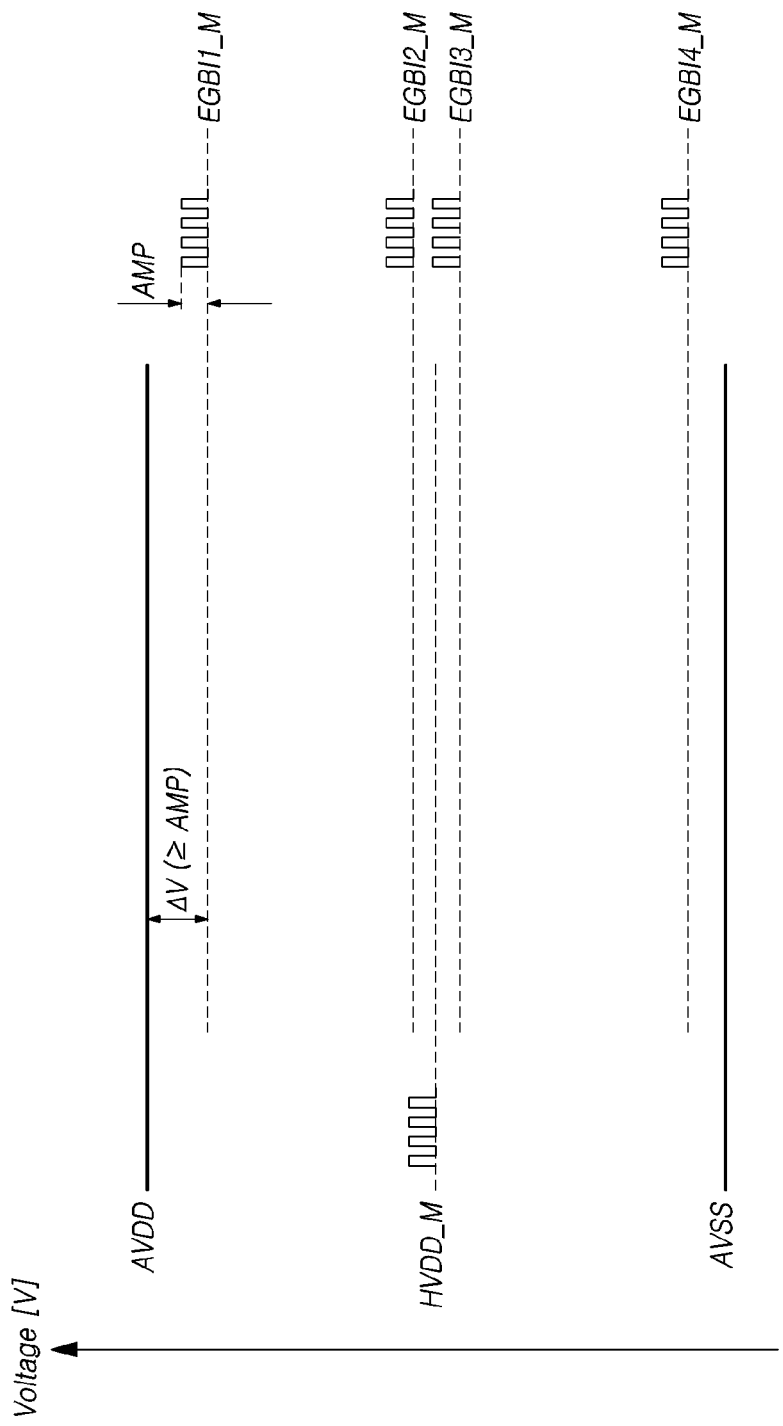
FIG. 16 is a diagram illustrating voltage levels and characteristics of gamma reference voltages which are used in a gamma block for performing time-free driving on data lines using a gamma modulation method in the time-free driving system of the touch display device according to one embodiment.

FIG. 15 is a diagram illustrating an example of a gamma block GMA for performing time-free driving TFD on the data lines DL using the gamma modulation technique in the time-free driving (TFD) system of the touch display device according to one embodiment. FIG. 16 is a diagram illustrating voltage levels and characteristics of the gamma reference voltages EGBI1_M, EGBI2_M, EGBI3_M, and EGBI4_M which are used in the gamma block GMA for performing time-free driving on the data lines DL using the gamma modulation technique in the time-free driving system of the touch display device according to one embodiment.

In the following description, it is assumed that the data lines DL are driven on the basis of polarity inversion driving.

The gamma block GMA in the data driving circuit DDC can include a digital-to-analog converter DAC that converts an image digital signal to an image analog signal having a positive polarity or a negative polarity using the gamma reference voltages EGBILM, EGBI2_M, EGBI3_M, and EGBI4_M.

The digital-to-analog converter DAC includes a first conversion part (a positive conversion part) and a second conversion part (a negative conversion part).

The first conversion part of the digital-to-analog converter DAC includes a first resistor string P-RS in which a plurality of resistors are connected in series and a first switch P-SW that selects an image analog voltage having a positive polarity on the basis of an image digital signal. The second conversion part of the digital-to-analog converter DAC includes a second resistor string N-RS in which a plurality of resistors are connected in series and a second switch N-SW that selects an image analog voltage having a negative polarity on the basis of an image digital signal.

The gamma block GMA in the data driving circuit DDC can further include a multiplexer MUX that selects an image analog voltage having a positive polarity and an image analog voltage having a negative polarity, a first output buffer circuit P-BUF that outputs a first data signal Vdata corresponding to the image analog signal having a positive polarity to the data lines DL, and a second output buffer circuit N-BUF that outputs a second data signal Vdata corresponding to the image analog signal having a negative polarity to the data lines DL.

Referring to FIGS. 15 and 16, when the data driving circuit DDC performs polarity inversion driving, the gamma reference voltage EGBI_M of a modulated signal pattern can include a first gamma reference voltage EGBI1_M and a second gamma reference voltage EGBI2_M which are applied to both ends of the resistor string having a positive polarity P-RS and include a third gamma reference voltage EGBI3_M and a fourth gamma reference voltage EGBI4_M which are applied to both ends of the resistor string having a negative polarity N-RS.

The four gamma reference voltages EGBI1_M, EGBI2_M, EGBI3_M, and EGBI4_M may be signals which are generated by modulating the frequency and the phase of the first touch electrode driving signal TDS1 in synchronization.

Each of the four gamma reference voltages EGBI1_M, EGBI2_M, EGBI3_M, and EGBI4_M is a variable voltage and can have an amplitude equal or similar to the first amplitude AMP1 of the first touch electrode driving signal TDS1.

In other words, the digital-to-analog converter DAC in the data driving circuit DDC can receive the first gamma reference voltage EGBI1_M, the second gamma reference voltage EGBI2_M, the third gamma reference voltage EGBI3_M, and the fourth gamma reference voltage EGBI4_M having a frequency and a phase corresponding to those of the first touch electrode driving signal TDS1 and convert an image digital signal into a first image analog signal (an image analog signal having a positive polarity) in response to the first gamma reference voltage EGBI1_M and the second gamma reference voltage EGBI2_M or convert an image digital signal into a second image analog signal (an image analog signal having a negative polarity) in response to the third gamma reference voltage EGBI3_M and the fourth gamma reference voltage EGBI4_M.

The first output buffer circuit P-BUF can receive the first image analog signal and output a first data signal Vdata to the data lines DL.

The second output buffer circuit N-BUF can receive the second image analog signal and output a second data signal Vdata to the data lines DL.

The first data signal Vdata is a data signal Vdata having a positive polarity which is output to the data lines DL in the i-th frame. The second data signal Vdata is a data signal Vdata having a negative polarity which is output to the data lines DL in the (i+1)-th frame.

Referring to FIGS. 15 and 16, the first gamma reference voltage EGBI1_M is a positive-high gamma reference voltage, the second gamma reference voltage EGBI2_M is a positive-low gamma reference voltage, the third gamma reference voltage EGBI3_M is a negative-high gamma reference voltage, and the fourth gamma reference voltage EGBI4_M is a negative-low gamma reference voltage.

The first gamma reference voltage EGBI1_M, the second gamma reference voltage EGBI2_M, the third gamma reference voltage EGBI3_M, and the fourth gamma reference voltage EGBI4_M are modulated signals which swing in synchronization with the first touch electrode driving signal TDS1 and can have a frequency and a phase corresponding to those of the first touch electrode driving signal TDS1.

The first gamma reference voltage EGBI1_M, the second gamma reference voltage EGBI2_M, the third gamma reference voltage EGBI3_M, the fourth gamma reference voltage EGBI4_M can have an amplitude AMP corresponding to the first amplitude AMP1 of the first touch electrode driving signal TDS1.

The first gamma reference voltage EGBI1_M can be set to a voltage higher than the second gamma reference voltage EGBI2_M. The second gamma reference voltage EGBI2_M can be set to a voltage higher than the third gamma reference voltage EGBI3_M. The third gamma reference voltage EGBI3_M can be set to a voltage higher than the fourth gamma reference voltage EGBI4_M.

On the other hand, referring to FIG. 15, the first output buffer circuit P-BUF can operate with the drive voltage AVDD applied to a PH node and the half drive voltage HVDD_M applied to a PL node.

The second output buffer circuit N-BUF can operate with the half drive voltage HVDD_M applied to an NH node and the base voltage AVSS applied to an NL node.

The drive voltage AVDD applied to the first output buffer circuit P-BUF and the half drive voltage HVDD_M applied to the second output buffer circuit N-BUF are voltages that perform the same function (a buffer drive voltage). The half drive voltage HVDD_M applied to the first output buffer circuit P-BUF and the base voltage AVSS applied to the second output buffer circuit N-BUF are voltages that perform the same function (a buffer base voltage).

The drive voltage AVDD may be a DC voltage. The base voltage AVSS may be a DC voltage which is lower than the drive voltage AVDD. For example, the base voltage AVSS may be 0 V.

The half drive voltage HVDD_M may be a signal of which the voltage swings between the drive voltage AVDD and the base voltage AVSS.

The half drive voltage HVDD_M may be a signal having a frequency and a phase corresponding to those of the first touch electrode driving signal TDS1. Accordingly, the half drive voltage HVDD_M can have a frequency and a phase corresponding to those of the first gamma reference voltage EGBI1_M, the second gamma reference voltage EGBI2_M, the third gamma reference voltage EGBI3_M, and the fourth gamma reference voltage EGBI4_M.

In some cases, the half drive voltage HVDD_M can have an amplitude corresponding to the first amplitude AMP1 of the first touch electrode driving signal TDS1. Accordingly, the half drive voltage HVDD_M can have an amplitude corresponding to those of the first gamma reference voltage EGBI1_M, the second gamma reference voltage EGBI2_M, the third gamma reference voltage EGBI3_M, and the fourth gamma reference voltage EGBI4_M.

The first gamma reference voltage EGBI1_M and the second gamma reference voltage EGBI2_M can be set to voltages which are higher than the half drive voltage HVDD_M. The third gamma reference voltage EGBI3_M and the fourth gamma reference voltage EGBI4_M can be set to voltages which are lower than the half drive voltage HVDD_M.

A low-level voltage of the fourth gamma reference voltage EGBI4_M can be set to be higher than the base voltage AVSS. Particularly, a difference ΔV between the low-level voltage of the first gamma reference voltage EGBI1_M and the drive voltage AVDD can be set to be equal to or greater than the amplitude AMP of the first gamma reference voltage EGBI1M.

Referring to FIG. 15, a voltage AVSS_M having an amplitude corresponding to the first amplitude AMP1 of the first touch electrode driving signal TDS1 can be applied to an NHV node which is commonly connected to a node (a PL node) at which the half drive voltage HVDD_M is applied to the first output buffer circuit P-BUF and a node (an NH node) at which the half drive voltage HVDD_M is applied to the second output buffer circuit N-BUF via a capacitor Ch.

The half drive voltage HVDD_M serves as a base voltage of a low level for the first output buffer circuit P-BUF and serves as a drive voltage of a high level for the second output buffer circuit N-BUF. In this regard, the capacitor Ch connected to the NHV node can help voltage stabilization of the NHV node and the half drive voltage HVDD_M.

Figure 17:
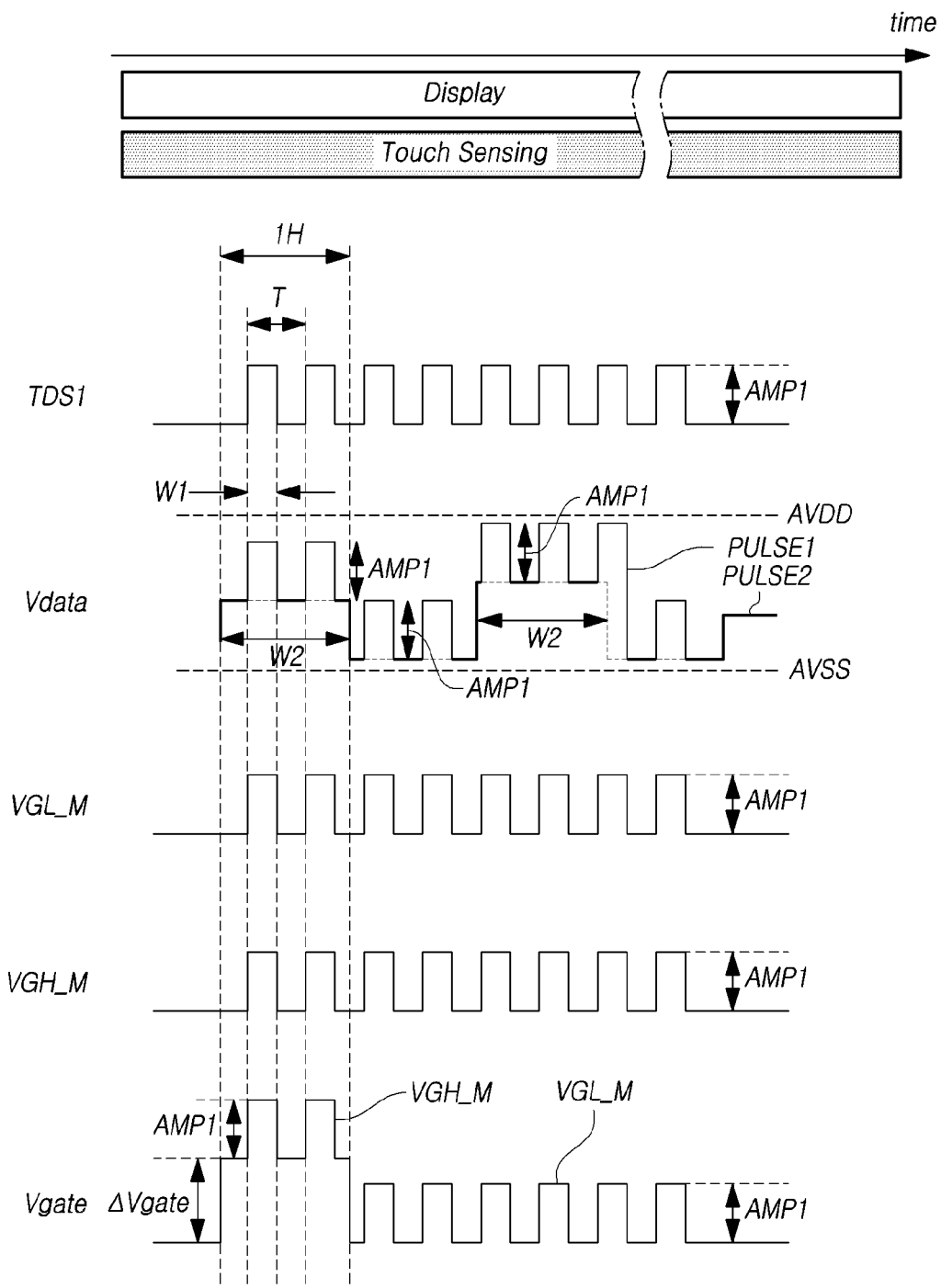
FIG. 17 is a diagram illustrating waveforms of principal signals for time-free driving when a frequency of a touch electrode driving signal is high in the touch display device according to one embodiment.
Figure 18:
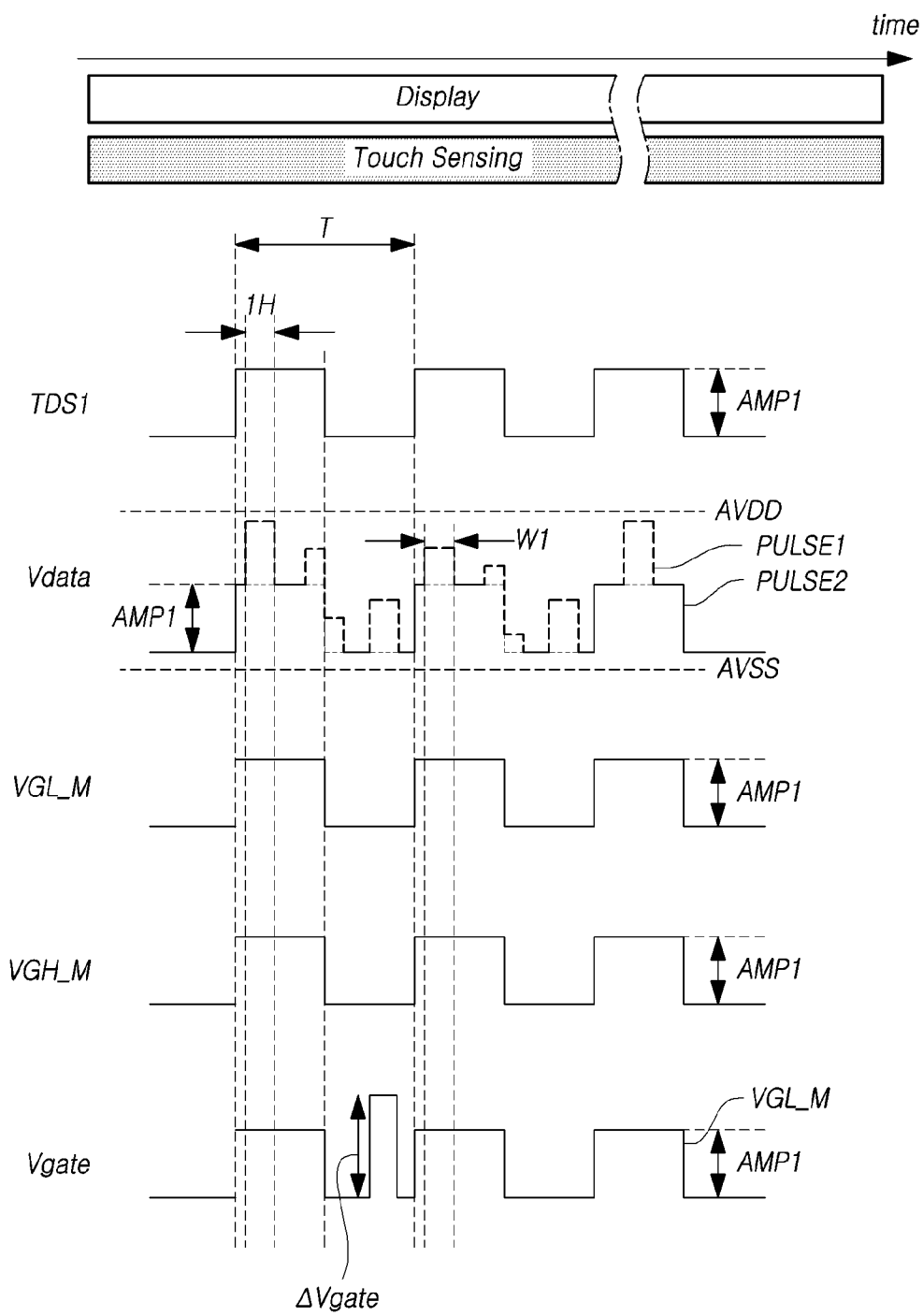
FIG. 18 is a diagram illustrating waveforms of principal signals for time-free driving when a frequency of a touch electrode driving signal is low in the touch display device according to one embodiment.

FIG. 17 is a diagram illustrating waveforms of principal signals TDS1, Vdata, VGL_M, VGH_M, and Vgate for time-free driving when the frequency of the first touch electrode driving signal TDS1 is high in the touch display device according to one embodiment. FIG. 18 is a diagram illustrating waveforms of principal signals TDS1, Vdata, VGL_M, VGH_M, and Vgate for time-free driving when the frequency of the first touch electrode driving signal TDS1 is low in the touch display device according to one embodiment.

The frequency of the first touch electrode driving signal TDS1 may be set to be high or low. That is, the period T of the first touch electrode driving signal TDS1 may be set to be short or long.

As illustrated in FIG. 17, the period T of the first touch electrode driving signal TDS1 may be shorter than a predetermined horizontal time 1H or a data voltage application period. As illustrated in FIG. 18, the period T of the first touch electrode driving signal TDS1 may be longer than the predetermined horizontal time 1H or the data voltage application period. Here, the predetermined horizontal time may be 1H, 2H, 3H, or the like, wherein 1H, 2H, 3H, etc., may denote the time for displaying 1 horizontal line, 2 horizontal lines, 3 horizontal lines, etc., of subpixels in the display device. In the following description, it is assumed that the predetermined horizontal time is 1H.

Referring to FIG. 17, the first touch electrode driving signal TDS1 is a signal of which a voltage level varies periodically, the period T or the width of a high-level voltage period of the first touch electrode driving signal TDS1 may be shorter than one horizontal time 1H.

In this case, in a high-level voltage period of a data signal Vdata for displaying an image which is supplied to at least one data line DL or a high-level voltage period of a scan signal Vgate which is supplied to at least one gate line GL, the voltage level of the first touch electrode driving signal TDS1 may vary one or more times.

Referring to FIG. 18, the period T or the width of the high-level voltage period of the first touch electrode driving signal TDS1 may be longer than one horizontal time 1H or the data voltage application period.

In this case, in the period T or the high-level voltage period of the first touch electrode driving signal TDS1, the voltage level of the data signal Vdata for displaying an image which is supplied to at least one data line DL may vary one or more times or the voltage level of the scan signal Vgate which is supplied to at least one gate line GL may vary one or more times.

Signal waveforms will be described below in more detail with reference to FIGS. 17 and 18.

Referring to FIGS. 17 and 18, when display driving and touch driving are simultaneously performed on the basis of the time-free driving system, the data signal Vdata may have a signal pattern in which first pulses PULSE1 having a first pulse width W1 and second pulses PULSE2 having a second pulse width W2 are combined. Here, the second pulse width W2 may be greater than the first pulse width W1.

Referring to FIGS. 17 and 18, the data signal Vdata may have a voltage varying between the drive voltage AVDD and the base voltage AVSS.

As illustrated in FIG. 17, when the period T of the first touch electrode driving signal TDS1 is shorter than a predetermined horizontal time (for example, 1H), the first pulses PULSE1 in the data signal Vdata may include a part having an amplitude corresponding to the first amplitude AMP1 of the first touch electrode driving signal TDS1. The first pulse width W1 of the first pulses PULSE1 may correspond to the pulse width of the first touch electrode driving signal TDS1.

As illustrated in FIG. 18, when the period T of the first touch electrode driving signal TDS1 is longer than a predetermined horizontal time (for example, 1H), the second pulses PULSE2 in the data signal Vdata may include a part having an amplitude corresponding to the first amplitude AMP1 of the first touch electrode driving signal TDS1. The second pulse width W2 of the second pulses PULSE2 may correspond to the pulse width of the first touch electrode driving signal TDS1.

Referring to FIGS. 17 and 18, a frequency and a phase of an OFF-level gate voltage VGL_M which is supplied from the touch power circuit TPIC to the gate driving circuit GDC correspond to those of the first touch electrode driving signal TDS1. A frequency and a phase of an ON-level gate voltage VGH_M which is supplied from the touch power circuit TPIC to the gate driving circuit GDC correspond to those of the first touch electrode driving signal TDS1.

Referring to FIGS. 17 and 18, the OFF-level gate voltage VGL_M and the ON-level gate voltage VGH_M may have the same amplitude as the first amplitude AMP1 of the first touch electrode driving signal TDS1 or substantially the same amplitude within an allowable range.

Referring to FIG. 17, the scan signal Vgate which is supplied to the gate line GL may be the OFF-level gate voltage VGL_M in a period other than the horizontal time (1H) in which the corresponding gate line GL is driven with the ON-level gate voltage VGH_M. The scan signal Vgate may be the ON-level gate voltage VGH_M in the horizontal time (1H) in which the corresponding gate line GL is driven with the ON-level gate voltage VGH_M. The scan signal Vgate may have a pattern in which a voltage (ΔVgate) corresponding to the amplitude required for turning on a transistor included in the corresponding pixel, which is supplied to the gate electrode of the transistor, is added to the ON-level gate voltage VGH_M. Here, the voltage (ΔVgate) corresponding to the amplitude required for opening the corresponding gate line GL may be a voltage difference between a high-level gate voltage VGH and a low-level gate voltage VGL of a DC voltage pattern.

Referring to FIG. 17, the scan signal Vgate which is supplied to the gate line GL has a pattern in which the OFF-level gate voltage VGL_M of a modulated signal pattern is superimposed on the voltage ΔVgate corresponding to the amplitude required for turning on a transistor in the horizontal time (1H) in which the corresponding gate line GL is driven with the gate high voltage VGH and has a pattern of the OFF-level gate voltage VGL_M of a modulated signal pattern in a time other than the horizontal time (1H). Here, the OFF-level gate voltage VGL_M of a modulated signal pattern has a frequency and a phase corresponding to those of the first touch electrode driving signal TDS1.

Referring to FIG. 18, the scan signal Vgate which is applied to the gate lines GL has a pattern in which the voltage ΔVgate corresponding to the amplitude required for opening the corresponding gate line GL is superimposed on the OFF-level gate voltage VGL_M of a modulated signal pattern in the horizontal time (1H) in which the corresponding gate line GL is open, and has a pattern of the OFF-level gate voltage VGL_M of a modulated signal pattern in a time other than the horizontal time (1H). Here, the OFF-level gate voltage VGL_M of a modulated signal pattern has a frequency and a phase corresponding to those of the first touch electrode driving signal TDS1.

As described above, the touch display device can employ a gamma modulation method as a method of simultaneously executing display driving and touch driving.

In this case, a data signal Vdata and a scan signal Vgate which are modulated to have a frequency and a phase corresponding to those of the first touch electrode driving signal TDS1 in accordance with gamma modulation are supplied to the display panel DISP to which a ground voltage of a DC voltage is applied.

On the other hand, as described above, the touch display device may employ a ground modulation method in addition to a gamma modulation method as the method of simultaneously executing display driving and touch driving.

In the ground modulation method, the data signal Vdata and the scan signal Vgate which are supplied to the display panel DISP have a frequency and a phase corresponding to those of the first touch electrode driving signal TDS1 on the display panel DISP by causing the ground voltage supplied to the display panel DISP to swing to correspond to the frequency and the phase of the first touch electrode driving signal TDS1.

In other words, the gamma modulation method is a method of supplying the display relevant signals Vdata and Vgate to the display panel DISP in a modulated signal pattern corresponding to the first touch electrode driving signal TDS1 in a state in which the DC ground voltage is applied to the display panel DISP.

On the other hand, the ground modulation method is a method of supplying the display relevant signals Vdata and Vgate to the display panel DISP without modulation, whereby the display relevant signals Vdata and Vgate supplied to the display panel DISP have a modulated signal pattern corresponding to the first touch electrode driving signal TDS1 because the ground voltage of a modulated signal pattern is applied to the display panel DISP.

In the following description, for the purpose of convenience of explanation, the first and third touch electrode driving signals TDS1 and TDS3 of which the voltage level varies are referred to as a touch electrode driving signal TDS.

Figure 19:
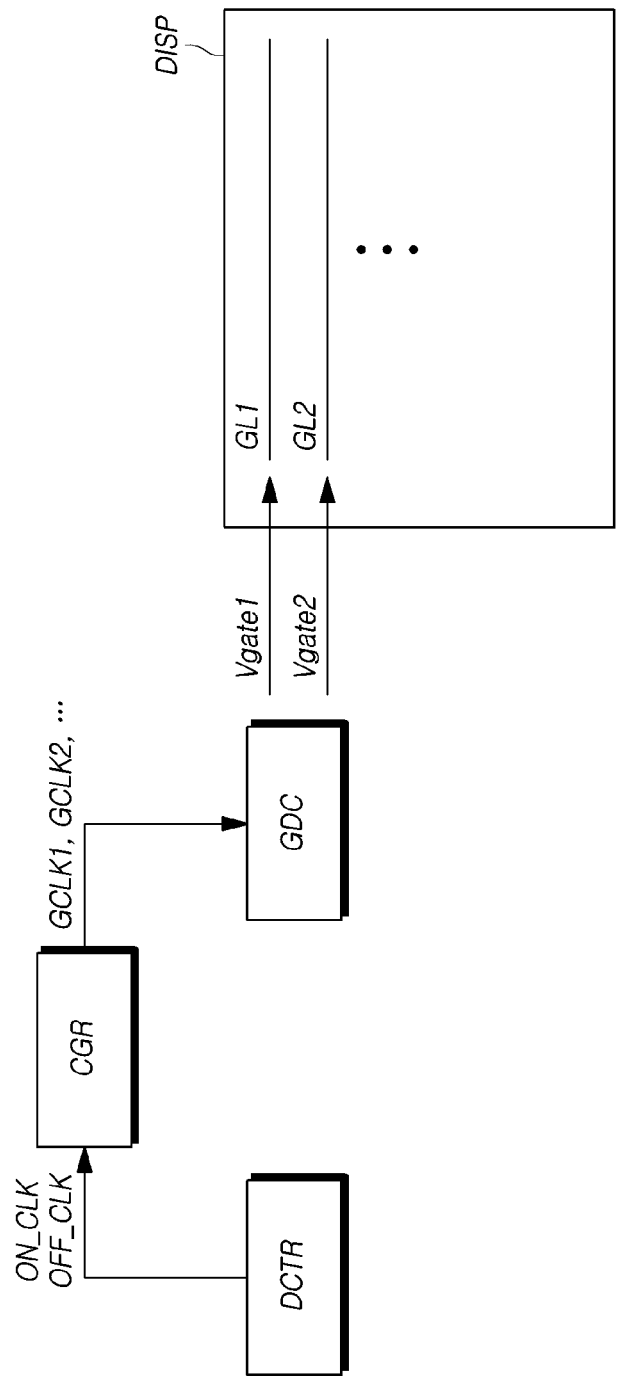
FIG. 19 is a diagram illustrating a process of generating a scan signal for gate driving in the touch display device according to one embodiment.
Figure 20:
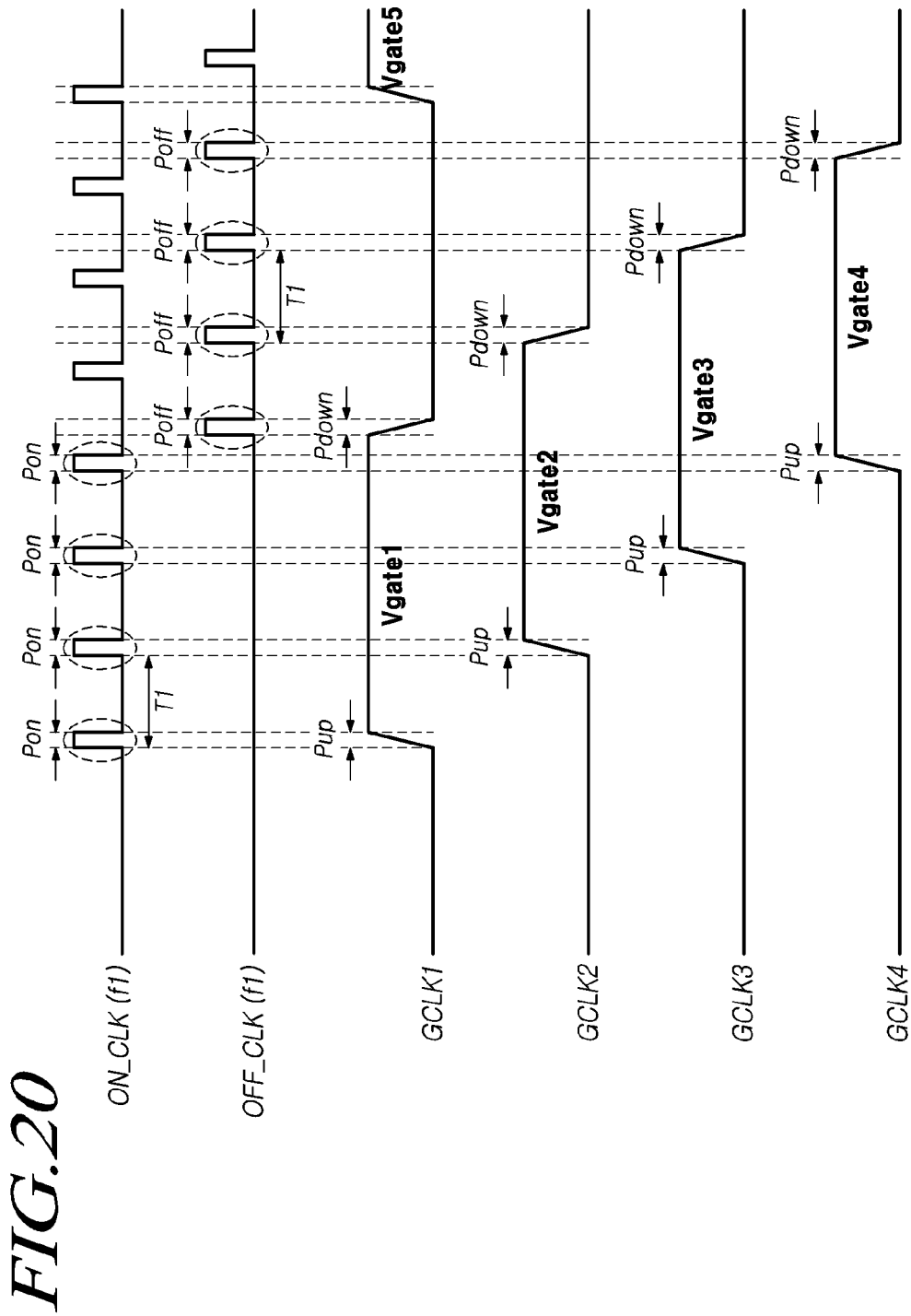
FIG. 20 is a diagram illustrating an ON-clock signal, an OFF-clock signal, and a scan signal which are associated with gate driving in the touch display device according to one embodiment.

FIG. 19 is a diagram illustrating a process of generating a scan signal Vgate for gate driving in the touch display device according to one embodiment. FIG. 20 is a diagram illustrating an ON-clock signal ON_CLK, an OFF-clock signal OFF_CLK, and a scan signal Vgate which are associated with gate driving in the touch display device according to one embodiment.

Referring to FIG. 19, the display controller DCTR outputs an ON-clock signal ON_CLK and an OFF-clock signal OFF_CLK to a clock generator CGR for the purpose of gate driving.

The clock generator CGR generates two or more gate clock signals GCLK1, GCLK2, . . . on the basis of the ON-clock signal ON_CLK and the OFF-clock signal OFF_CLK and outputs the generated gate clock signals. For example, the clock generator CGR may be a level shifter L/S.

The clock generator CGR can generate two or more gate clock signals GCLK1, GCLK2, . . . depending on a gate driving system.

The gate driving circuit GDC generates scan signals Vgate1, Vgate2, . . . on the basis of the two or more gate clock signals GCLK1, GCLK2, . . . and sequentially outputs the generated scan signals to the plurality of gate lines GL1, GL2, . . . .

Each of the scan signals Vgate1, Vgate2, . . . is a clock pulse suitable for the corresponding timing out of a plurality of clock pulses included in one gate clock signal.

In FIG. 20, it is assumed that gate driving is performed using four gate clock signals GCLK1, GCLK2, GCLK3, and GCLK4.

Referring to FIG. 20, the high-level period Pon of the ON-clock signal ON_CLK is repeated with a constant period T1. The high-level period Poff of the OFF-clock signal OFF_CLK is repeated with a constant period T1. The ON-clock signal ON_CLK and the OFF-clock signal OFF_CLK have the same frequency (f1=1/T1).

The clock generator CGR can generate the gate clock signals GCLK1, GCLK2, GCLK3, and GCLK4 using the ON-clock signal ON_CLK and the OFF-clock signal OFF_CLK.

Referring to FIG. 20, the gate clock signals GCLK1, GCLK2, GCLK3, and GCLK4 rise in the high-level period Pon of the ON-clock signal ON_CLK. That is, rising sections Pup of the gate clock signals GCLK1, GCLK2, GCLK3, and GCLK4 correspond to the high-level period Pon of the ON-clock signal ON_CLK.

Referring to FIG. 20, the gate clock signals GCLK1, GCLK2, GCLK3, and GCLK4 fall in the high-level period Poff of the OFF-clock signal OFF_CLK. That is, falling sections Pdown of the gate clock signals GCLK1, GCLK2, GCLK3, and GCLK4 correspond to the high-level period Poff of the OFF-clock signal OFF_CLK.

The scan signals Vgate1, Vgate2, Vgate3, Vgate 4, . . . can be generated on the basis of the gate clock signals GCLK1, GCLK2, GCLK3, and GCLK4 which are generated as described above.

Figure 21:
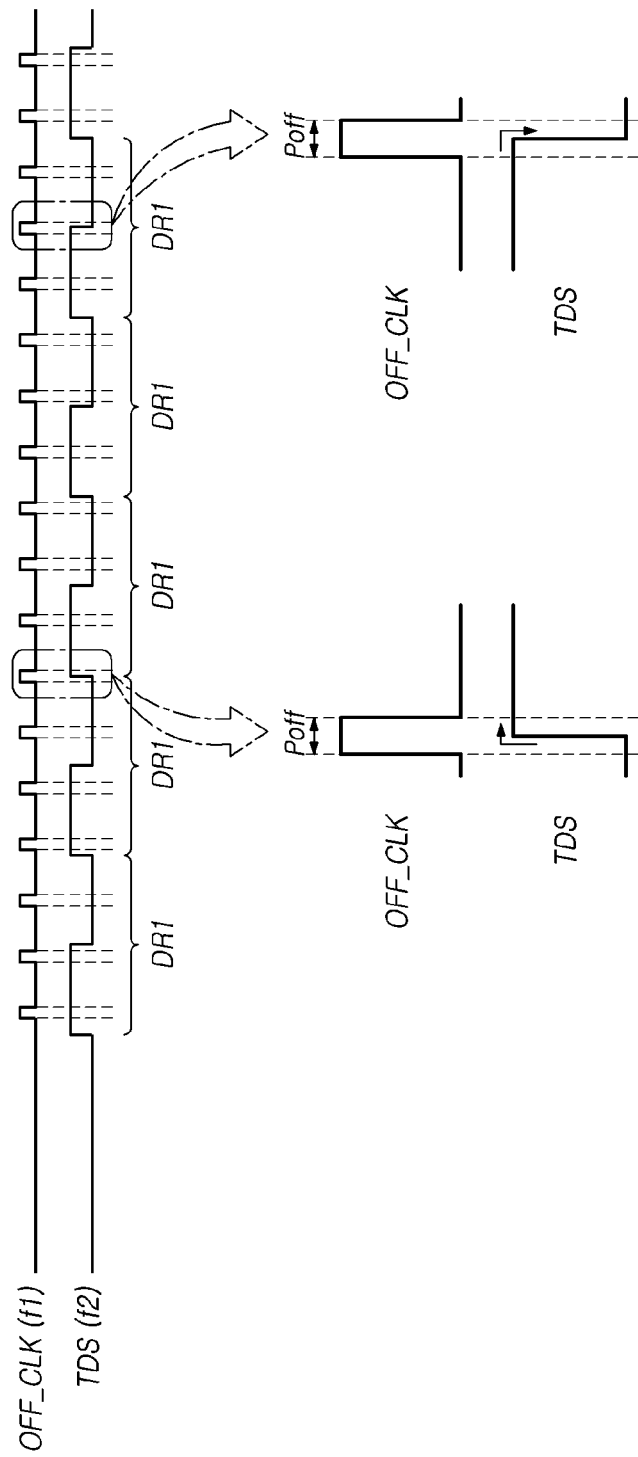

FIGS. 21 and 22 are diagrams illustrating a case in which a voltage level of a touch electrode driving signal TDS varies in the high-level section Poff of the OFF-clock signal OFF_CLK and an image defect of a line pattern based thereon in the touch display device according to one embodiment.

Referring to FIG. 21, the frequency f1 of the OFF-clock signal OFF_CLK may be different from the frequency f2 of the touch electrode driving signal TDS. Accordingly, a situation in which the voltage level of the touch electrode driving signal TDS varies in the high-level period Poff of the OFF-clock signal OFF_CLK may occur.

Similarly, since the frequency f1 of the ON-clock signal ON_CLK is different from the frequency f2 of the touch electrode driving signal TDS, a situation in which the voltage level of the touch electrode driving signal TDS varies in the high-level period Pon of the ON-clock signal ON_CLK may occur.

Referring to FIG. 22, when the voltage level of the touch electrode driving signal TDS varies in the high-level period Poff of the OFF-clock signal OFF_CLK and the high-level period Pon of the ON-clock signal ON_CLK (2200), the data lines DL under gamma modulation for simultaneous driving may be affected and an image defect of a line pattern may occur in the display panel DISP.

In other words, an image defect of subpixels included in a line block 2210 in which the gate lines GL which are supplied with the scan signal Vgate corresponding to the high-level period Poff of the OFF-clock signal OFF_CLK and the high-level period Pon of the ON-clock signal ON_CLK overlapping the variation of the voltage level of the touch electrode driving signal TDS are arranged may occur.

Even when the voltage level of the touch electrode driving signal TDS varies in the rising sections Pup and the falling sections Pdown of the gate clock signals GCLK1, GCLK2, . . . , the above-mentioned image defect of a line pattern may occur.

Even when the voltage level of the touch electrode driving signal TDS varies in the rising sections Pup and the falling sections Pdown of the scan signals Vgate1, Vgate2, . . . , the above-mentioned image defect of a line pattern may occur.

Since touch driving and display driving are simultaneously performed as described above, touch driving affects display driving to cause an image defect.

In the following description, a driving method for reducing an image defect of a line pattern which is caused due to timing mismatch between the gate driving relevant signals ON_CLK, OFF_CLK, GCLK, and Vgate and the touch electrode driving signal TDS will be described.

Figure 23B:
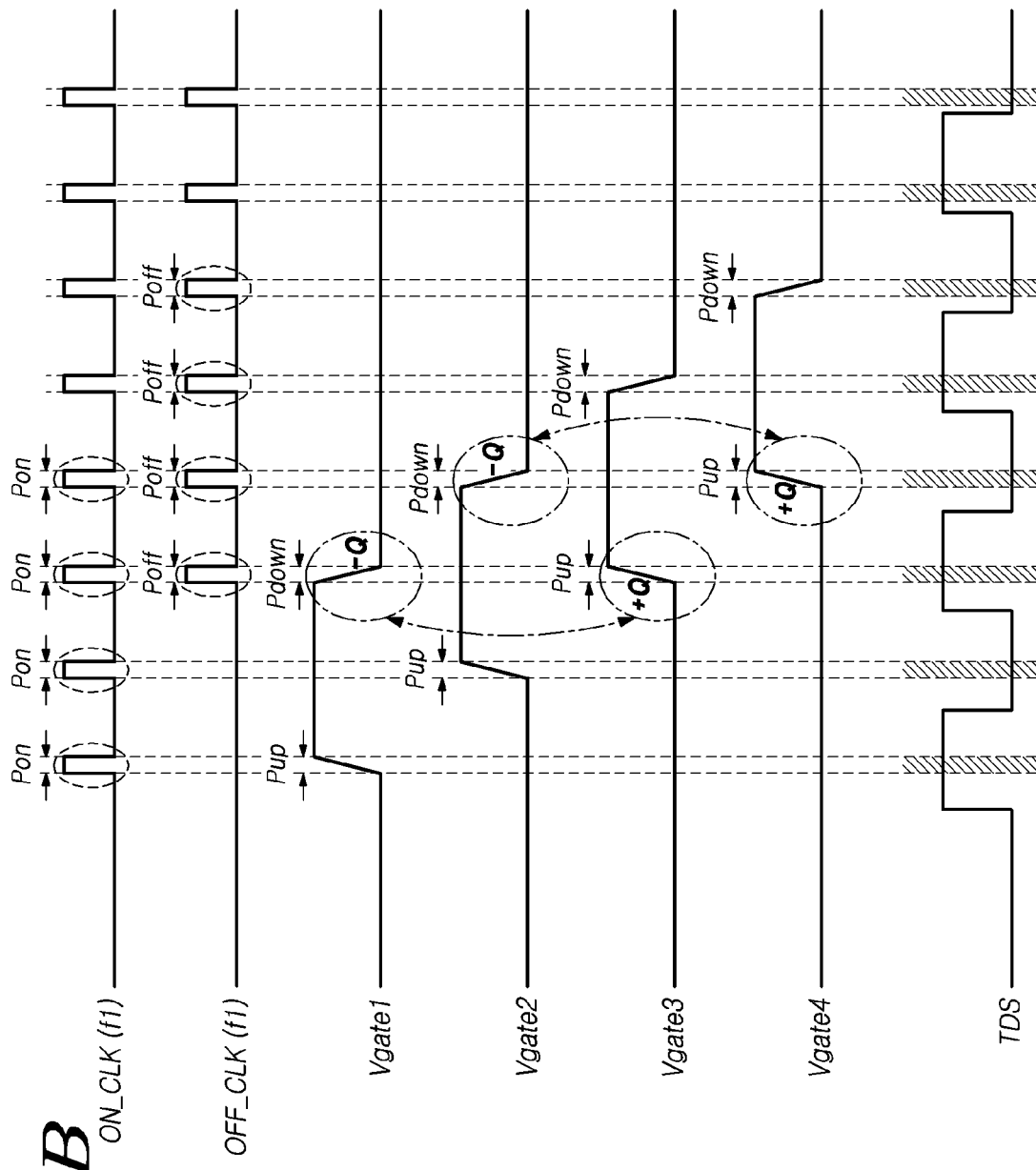

FIGS. 23A and 23B are diagrams illustrating a driving method for reducing an image defect of a line pattern from occurring due to timing mismatch between the gate driving relevant signals ON_CLK, OFF_CLK, GCLK, and Vgate and the touch electrode driving signal TDS in the touch display device according to one embodiment.

Referring to FIGS. 23A and 23B, the touch driving circuit TDC outputs the touch electrode driving signal TDS of which the voltage level varies in a period other than the high-level period Pon of the ON-clock signal ON_CLK to one or more of the plurality of touch electrodes TE.

The touch driving circuit TDC outputs the touch electrode driving signal TDS of which the voltage level varies in a period other than the high-level period Poff of the OFF-clock signal OFF_CLK to one or more of the plurality of touch electrodes TE.

The touch driving circuit TDC outputs the touch electrode driving signal TDS of which the voltage level varies in a section other than the rising sections Pup and the falling sections Pdown of the gate clock signals GCLK1, GCLK2, . . . to one or more of the plurality of touch electrodes TE.

The touch driving circuit TDC outputs the touch electrode driving signal TDS of which the voltage level varies in a section other than the rising sections Pup and the falling sections Pdown of the scan signals Vgate1, Vgate2, . . . to one or more of the plurality of touch electrodes TE.

The touch controller TCTR can perform control such that the voltage level of the touch electrode driving signal TDS varies in a period other than the high-level period Pon of the ON-clock signal ON_CLK. Here, when the voltage level of the touch electrode driving signal TDS varies in a period other than the high-level period Pon of the ON-clock signal ON_CLK, it means that the high-level period Pon of the ON-clock signal ON_CLK and the voltage level variation section of the touch electrode driving signal TDS are different timings.

The touch controller TCTR can perform control such that the voltage level of the touch electrode driving signal TDS varies in a period other than the high-level period Poff of the OFF-clock signal OFF_CLK. Here, when the voltage level of the touch electrode driving signal TDS varies in a period other than the high-level period Poff of the OFF-clock signal OFF_CLK, it means that the high-level period Poff of the OFF-clock signal OFF_CLK and the voltage level variation section of the touch electrode driving signal TDS are different timings.

The touch controller TCTR can perform control such that the voltage level of the touch electrode driving signal TDS varies in a section other than the rising sections Pup and the falling sections Pdown of the gate clock signals GCLK1, GCLK2, .... Here, when the voltage level of the touch electrode driving signal TDS varies in a section other than the rising sections Pup and the falling sections Pdown of the gate clock signals GCLK1, GCLK2, ..., it means that the rising sections Pup and the falling sections Pdown of the gate clock signals GCLK1, GCLK2, ... and the voltage level variation section of the touch electrode driving signal TDS are different timings.

The touch controller TCTR can perform control such that the voltage level of the touch electrode driving signal TDS varies in a section other than the rising sections Pup and the falling sections Pdown of the scan signals Vgate1, Vgate2, .... Here, when the voltage level of the touch electrode driving signal TDS varies in a section other than the rising sections Pup and the falling sections Pdown of the scan signals Vgate1, Vgate2, ..., it means that the rising sections Pup and the falling sections Pdown of the scan signals Vgate1, Vgate2, ... and the voltage level variation section of the touch electrode driving signal TDS are different timings.

As illustrated in FIG. 23A, the touch display device can perform control such that the high-level period Pon of the ON-clock signal ON_CLK and the high-level period Poff of the OFF-clock signal OFF_CLK are different timings. That is, the touch display device can perform control such that the high-level period Pon of the ON-clock signal ON_CLK and the high-level period Poff of the OFF-clock signal OFF_CLK do not overlap each other and do not match each other.

The high-level period Pon of the ON-clock signal ON_CLK is associated with the rising sections Pup of the scan signals Vgate1, Vgate2, Vgate 3, Vgate4, ..., and the high-level period Poff of the OFF-clock signal OFF_CLK is associated with the falling sections Pdown of the scan signals Vgate1, Vgate2, Vgate 3, Vgate4, In some cases, the ON-clock signal ON_CLK and the OFF-clock signal OFF_CLK may change to a negative signal pattern. In this case, the low-level period of the ON-clock signal ON_CLK may be associated with the rising sections Pup of the scan signals Vgate1, Vgate2, Vgate 3, Vgate4, ..., and the low-level period of the OFF-clock signal OFF_CLK may be associated with the falling sections Pdown of the scan signals Vgate1, Vgate2, Vgate 3, Vgate4, ....

In consideration of the relationship between two clock signals ON_CLK and OFF_CLK and the scan signals Vgate1, Vgate2, Vgate 3, Vgate4, ..., the falling section Pdown of the first scan signal Vgate1 which is supplied to the first gate line GL1 of the plurality of gate lines GL and the rising section Pup of another scan signal (for example, Vgate3) which is supplied to a gate line (for example, GL3) other than the first gate line GL1 may be different timings.

As illustrated in FIG. 23B, the touch display device can perform control such that the high-level period Pon of the ON-clock signal ON_CLK and the high-level period Poff of the OFF-clock signal OFF_CLK correspond to each other. Here, when the high-level period Pon of the ON-clock signal ON_CLK and the high-level period Poff of the OFF-clock signal OFF_CLK correspond to each other, it means that the high-level period Pon of the ON-clock signal ON_CLK and the high-level period Poff of the OFF-clock signal OFF_CLK are temporally the same period or are periods which partially temporally overlap each other.

In consideration of the relationship between two clock signals ON_CLK and OFF_CLK and the scan signals Vgate1, Vgate2, Vgate 3, Vgate4, ..., the falling section Pdown of the first scan signal Vgate1 which is supplied to the first gate line GL1 of the plurality of gate lines GL and the rising section Pup of a third scan signal Vgate3 which is supplied to a third gate line GL3 other than the first gate line GL1 of the plurality of gate lines may correspond to each other.

Here, the first gate line GL1 and the third gate line GL3 which are different from each other can overlap the same touch electrode, e.g. touch electrode TE2 described herein below in connection with FIGS. 27 and 28. One or more other gate lines GL2 may be disposed between the first gate line GL1 and the third gate line GL3. On the other hand, the first gate line GL1 and the third gate line GL3 may be neighboring gate lines.

In consideration of the relationship between two clock signals ON_CLK and OFF_CLK and the scan signals Vgate1, Vgate2, Vgate 3, Vgate4, ..., the falling section Pdown of the second scan signal Vgate2 which is supplied to the second gate line GL2 of the plurality of gate lines GL may correspond to the rising section Pup of a fourth scan signal Vgate4 which is supplied to a fourth gate line GL4 other than the second gate line GL2.

Here, the second gate line GL2 and the fourth gate line GL4 which are different from each other can overlap the same touch electrode, e.g. touch electrode TE2 described herein below in connection with FIGS. 27 and 28. One or more other gate lines GL3 may be disposed between the second gate line GL2 and the fourth gate line GL4. On the other hand, the second gate line GL2 and the fourth gate line GL4 may be neighboring gate lines.

A control method based on the relationship between the frequency f1 of the ON-clock signal ON_CLK and the OFF-clock signal OFF_CLK and the frequency f2 of the touch electrode driving signal TDS will be described below. For the purpose of convenience of explanation, the OFF-clock signal OFF_CLK will be described as a reference.

Figure 24:
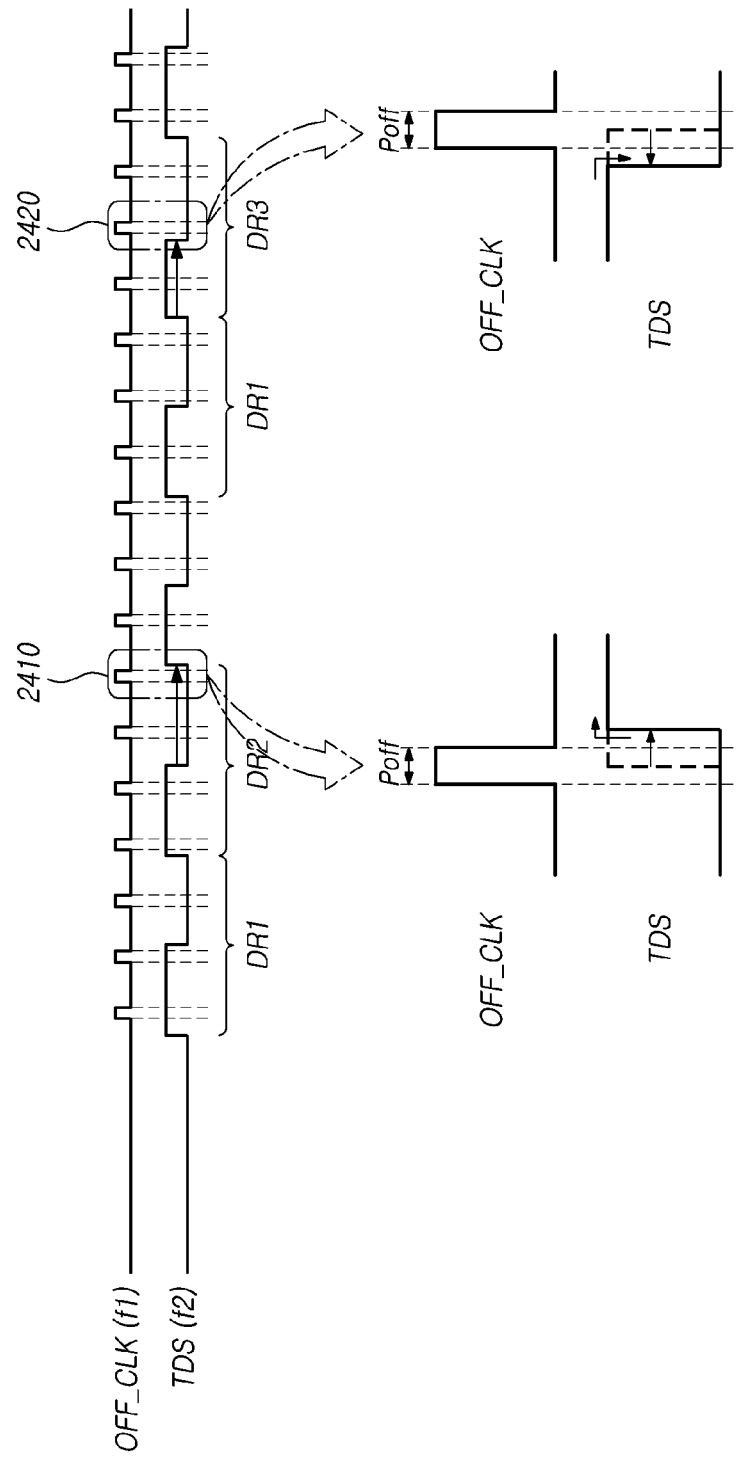
FIG. 24 is a diagram illustrating control for allowing a voltage level of a touch electrode driving signal to vary in a period other than a high-level period of an OFF-clock signal when a frequency of a touch electrode driving signal and a frequency of an ON-clock signal and an OFF-clock signal are different from each other in the touch display device according to one embodiment.

FIG. 24 is a diagram illustrating control for allowing the voltage level of the touch electrode driving signal TDS to vary in a period other than the high-level period Poff of the OFF-clock signal OFF_CLK when the frequency f2 of the touch electrode driving signal TDS and the frequency f1 of the OFF-clock signal OFF_CLK are different from each other in the touch display device according to one embodiment.

Referring to FIG. 24, the frequency f2 of the touch electrode driving signal TDS may be different from the frequency f1 of the ON-clock signal ON_CLK and the OFF-clock signal OFF_CLK.

Particularly, the frequency f2 of the touch electrode driving signal TDS may be other than N or 1/N times the frequency f1 of the ON-clock signal ON_CLK and the OFF-clock signal OFF_CLK.

Then, a section 2410 in which the voltage level of the touch electrode driving signal TDS rises is necessarily present in the high-level period Pon of the ON-clock signal ON_CLK and the high-level period Poff of the OFF-clock signal OFF_CLK.

In such a section 2410, the touch electrode driving signal TDS may rise with a delay after the high-level period Pon of the ON-clock signal ON_CLK and the high-level period Poff of the OFF-clock signal OFF_CLK have passed depending on adjustment of a duty ratio.

A section 2420 in which the voltage level of the touch electrode driving signal TDS falls is necessarily present in the high-level period Pon of the ON-clock signal ON_CLK and the high-level period Poff of the OFF-clock signal OFF_CLK.

In such a section 2420, the touch electrode driving signal TDS may fall before the high-level period Pon of the ON-clock signal ON_CLK and the high-level period Poff of the OFF-clock signal OFF_CLK have started depending on adjustment of a duty ratio.

As described above, when the frequency f2 of the touch electrode driving signal TDS is different from the frequency f1 of the OFF-clock signal OFF_CLK and control is performed such that the voltage level of the touch electrode driving signal TDS varies in a period other than the high-level period Poff of the OFF-clock signal OFF_CLK, the touch electrode driving signal TDS can have variable duty ratios DR1, DR2, . . . .

For example, referring to FIG. 24, the touch electrode driving signal TDS includes a first signal section having a first duty ratio DR1 and a second signal section having a second duty ratio DR2 which is different from the first duty ratio DR1.

When the second signal section of the touch electrode driving signal TDS has the second duty ratio DR2 which is different from the first duty ratio DR1, the voltage level in the second signal section of the touch electrode driving signal TDS can vary in a period other than the high-level period Pon of the ON-clock signal ON_CLK and the high-level period Poff of the OFF-clock signal OFF_CLK.

For example, referring to FIG. 24, the touch electrode driving signal TDS includes a first signal section having the first duty ratio DR1 and a third signal section having a third duty ratio DR3 which is different from the first duty ratio DR1.

When the third signal section of the touch electrode driving signal TDS has the third duty ratio DR3 which is different from the first duty ratio DR1, the voltage level in the third signal section of the touch electrode driving signal TDS can vary in a period other than the high-level period Pon of the ON-clock signal ON_CLK and the high-level period Poff of the OFF-clock signal OFF_CLK.

On the other hand, a method of performing control such that the voltage level of the touch electrode driving signal TDS varies in a period other than the high-level period Poff of the OFF-clock signal OFF_CLK when the frequency f1 of the OFF-clock signal OFF_CLK is N or 1/N times the frequency f2 of the touch electrode driving signal TDS will be described below.

Figure 25A:
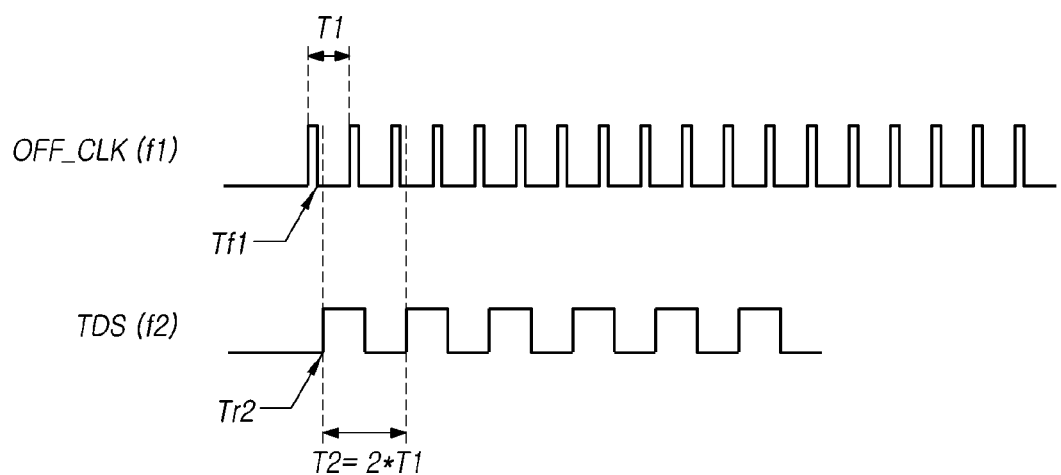
FIGS. 25A and 25B are diagrams illustrating control for allowing a voltage level of a touch electrode driving signal to vary in a period other than a high-level period of an OFF-clock signal when a frequency of an OFF-clock signal doubles a frequency of a touch electrode driving signal in the touch display device according to one embodiment.
Figure 25B:
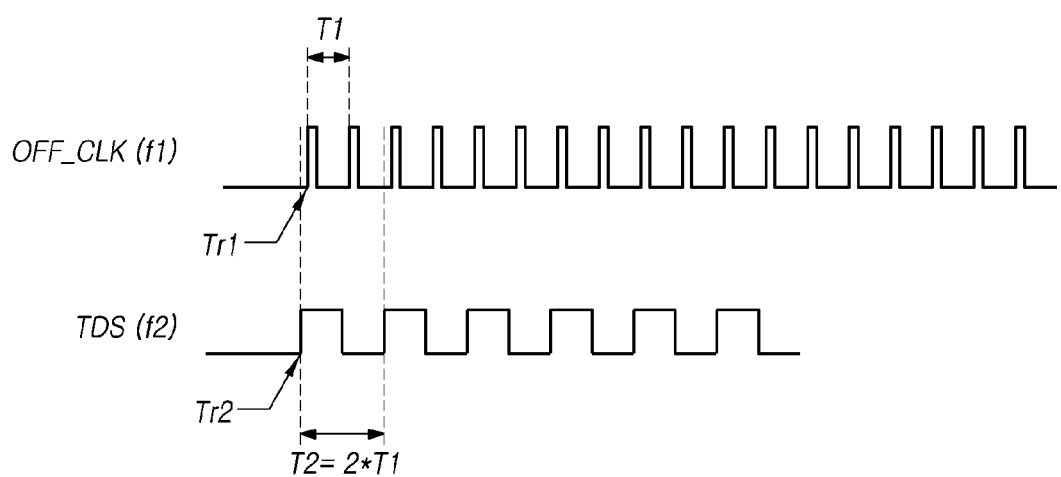
Figure 26A:
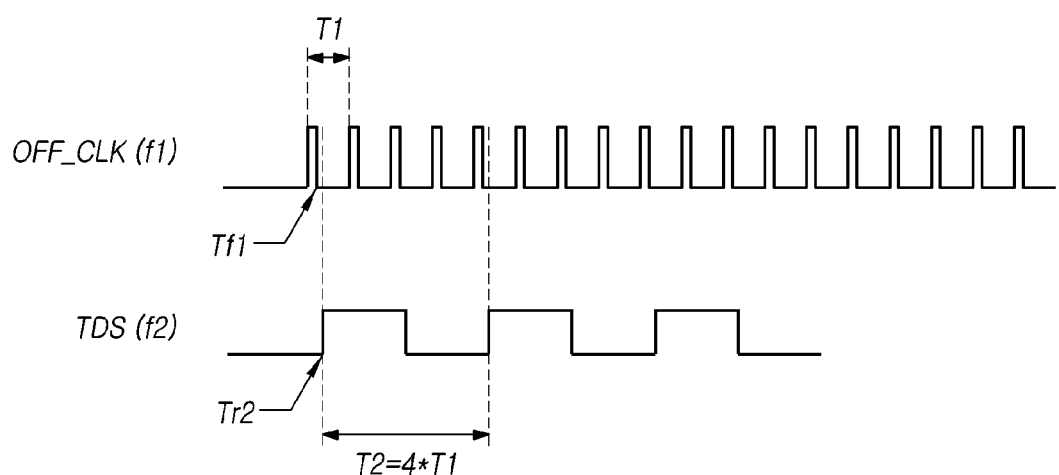
FIGS. 26A and 26B are diagrams illustrating control for allowing a voltage level of a touch electrode driving signal to vary in a period other than a high-level period of an OFF-clock signal when a frequency of an OFF-clock signal quadruples a frequency of a touch electrode driving signal in the touch display device according to one embodiment.
Figure 26B:
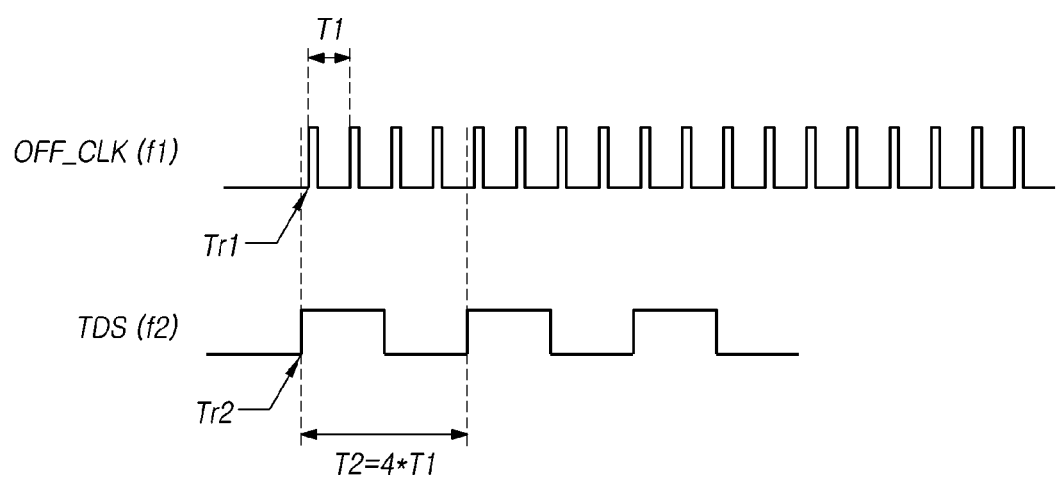

FIGS. 25A and 25B are diagrams illustrating control for allowing the voltage level of the touch electrode driving signal TDS to vary in a period other than the high-level period Poff of the OFF-clock signal OFF_CLK when the frequency f1 of the OFF-clock signal OFF_CLK doubles the frequency f2 of the touch electrode driving signal TDS in the touch display device according to one embodiment. FIGS. 26A and 26B are diagrams illustrating control for allowing the voltage level of the touch electrode driving signal TDS to vary in a period other than the high-level period Poff of the OFF-clock signal OFF_CLK when the frequency f1 of the OFF-clock signal OFF_CLK quadruples the frequency f2 of the touch electrode driving signal TDS in the touch display device.

Referring to FIGS. 25A and 25B, the voltage level of the OFF-clock signal OFF_CLK varies in a first period T1. The voltage level of the touch electrode driving signal TDS varies in a second period T2.

The second period T2 of the touch electrode driving signal TDS doubles the first period T1 of the OFF-clock signal OFF_CLK (T2=2×T1).

Accordingly, the frequency f1 of the OFF-clock signal OFF_CLK doubles the frequency f2 of the touch electrode driving signal TDS (f1=1/T1=1/(T2/2)=2(1/T2)=2f2).

Referring to FIGS. 26A and 26B, the second period T2 of the touch electrode driving signal TDS quadruples the first period T1 of the OFF-clock signal OFF_CLK (T2=4×T1) according to one embodiment.

Accordingly, the frequency f1 of the OFF-clock signal OFF_CLK quadruples the frequency f2 of the touch electrode driving signal TDS (f1=1/T1=1/(T2/4)=4(1/T2)=4f2).

As illustrated in FIGS. 25A and 26A, when the frequency f1 of the OFF-clock signal OFF_CLK is N times the frequency f2 of the touch electrode driving signal TDS (where N is a natural number), control can be performed such that the voltage level of the touch electrode driving signal TDS does not vary in the high-level period Poff of the OFF-clock signal OFF_CLK by setting a rising time point Tr2 of the touch electrode driving signal TDS to be later than a falling time point Tf1 of the OFF-clock signal OFF_CLK.

As illustrated in FIGS. 25B and 26B, when the frequency f1 of the OFF-clock signal OFF_CLK is N times the frequency f2 of the touch electrode driving signal TDS (where N is a natural number), control can be performed such that the voltage level of the touch electrode driving signal TDS does not vary in the high-level period Poff of the OFF-clock signal OFF_CLK by setting the rising time point Tr2 of the touch electrode driving signal TDS to be earlier than the rising time point Tr1 of the OFF-clock signal OFF_CLK.

According to the above-mentioned method, even when the frequency f1 of the OFF-clock signal OFF_CLK is 1/N times the frequency f2 of the touch electrode driving signal TDS (where N is a natural number), control can be performed such that the voltage level of the touch electrode driving signal TDS does not vary in the high-level period Poff of the OFF-clock signal OFF_CLK by appropriately controlling the rising time point and the falling time point of the touch electrode driving signal TDS and the OFF-clock signal OFF_CLK.

Similarly to the above-mentioned method, even when the frequency f1 of the OFF-clock signal OFF_CLK is 1/N times the frequency f2 of the touch electrode driving signal TDS (where N is a natural number), control can be performed such that the voltage level of the touch electrode driving signal TDS does not vary in the high-level period Pon of the ON-clock signal ON_CLK by appropriately controlling the rising time point and the falling time point of the touch electrode driving signal TDS and the ON-clock signal ON_CLK.

On the other hand, when the frequency f1 of the ON-clock signal ON_CLK and the OFF-clock signal OFF_CLK is N or 1/N times the frequency f2 of the touch electrode driving signal TDS (where N is a natural number), control can be performed such that the voltage level of the touch electrode driving signal TDS does not vary in the high-level period Pon of the ON-clock signal ON_CLK and the high-level period Poff of the OFF-clock signal OFF_CLK by controlling the rising/falling time points as described above, and thus duty ratio control of the touch electrode driving signal TDS is not necessary.

Accordingly, when the frequency f1 of the ON-clock signal ON_CLK and the OFF-clock signal OFF_CLK is N or 1/N times the frequency f2 of the touch electrode driving signal TDS (where N is a natural number), the touch electrode driving signal TDS has a constant duty ratio.

Figure 27:
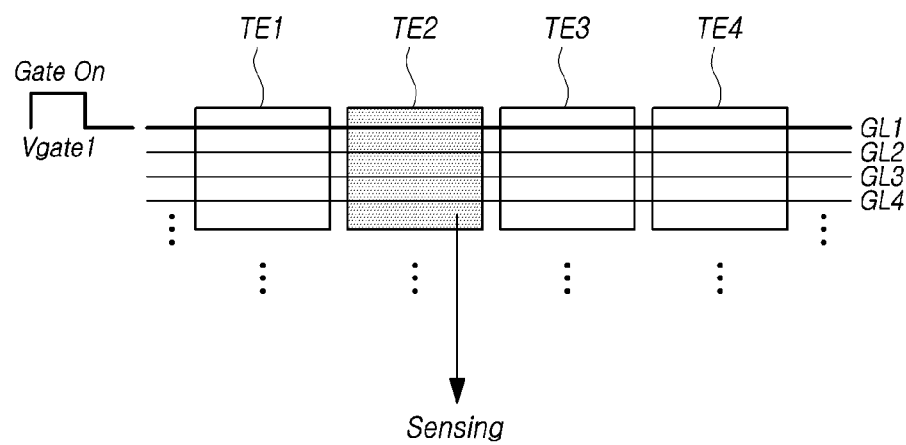
FIGS. 27 and 28 are diagrams illustrating effects of gate driving control in the touch display device according to one embodiment.
Figure 28:
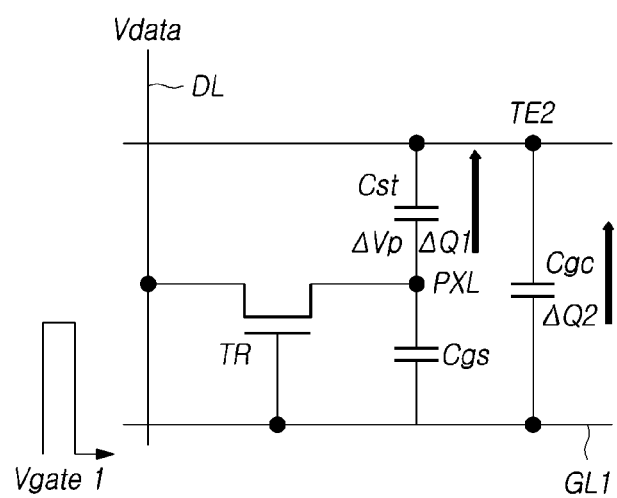

FIGS. 27 and 28 are diagrams illustrating effects of the gate driving control illustrated in FIG. 23B in the touch display device, where FIG. 27 is a diagram illustrating a situation in which a touch electrode TE2 which is to be sensed and a gate line GL1 which is to be turned on overlap each other and FIG. 28 is an equivalent circuit diagram of a subpixel which overlaps the touch electrode TE2 which is to be sensed and which is connected to the gate line GL1 which is to be turned on according to one embodiment.

Referring to FIG. 27, when display driving and touch driving are simultaneously performed, the touch electrode driving signal TDS is supplied to the touch electrodes TE1, TE2, TE3, TE4, . . . . Here, the touch electrode driving signal TDS is a signal for touch driving and also serves as a common voltage signal for display driving.

When display driving and touch driving are simultaneously performed, the touch driving circuit TDC senses all or some of the touch electrodes TE1, TE2, TE3, TE4, . . . to sense a touch. In the example illustrated in FIG. 27, one touch electrode TE2 of the touch electrodes TE1, TE2, TE3, TE4, . . . is to be sensed.

On the other hand, as described above, some gate lines GL1, GL2, GL3, GL4, which are arranged in the display panel DISP can overlap the touch electrodes TE1, TE2, TE3, TE4, . . . which are arranged in the same row.

Accordingly, when display driving and touch driving are simultaneously performed, a part (GL1 in the example illustrated in FIG. 27) of the gate lines GL1, GL2, GL3, GL4, . . . overlapping the touch electrode (TE2 in the example illustrated in FIG. 27) which is to be sensed out of the touch electrodes TE1, TE2, TE3, TE4, . . . is supplied with a scan signal of a turn-on level (Vgate1 in the example illustrated in FIG. 27) and is driven (turned on).

In FIG. 27, the scan signal Vgate1 of a turn-on level has a signal waveform (the same signal waveform as the scan signal Vgate illustrated in FIGS. 17 and 18) for simultaneously performing display driving and touch driving, but is illustrated as a signal waveform for performing only display driving for the purpose of convenience of explanation and easy understanding.

A transistor TR which is disposed in a subpixel SP illustrated in FIG. 28 is turned on by a scan signal Vgate1 of a turn-on level which is supplied via a part GL1 of the gate lines GL1, GL2, GL3, GL4, . . . overlapping the touch electrode TE2 which is to be sensed out of the touch electrodes TE1, TE2, TE3, TE4, . . . .

Equivalent circuits of all the other subpixels SP which are arranged on the display panel DISP are the same as the equivalent circuit of the subpixel SP illustrated in FIG. 28. The structure of the subpixel SP will be described in brief with reference to FIG. 28. The subpixel SP includes a transistor TR and a pixel electrode PXL.

The transistor TR in the subpixel SP includes a gate electrode connected to the gate line GL1, a drain electrode (or a source electrode) connected to the data line DL, and a source electrode (or a drain electrode) connected to the pixel electrode PXL.

The transistor TR in the subpixel SP is turned on in response to the scan signal Vgate1 which is supplied via the gate line GL1 and thus transmits a data signal Vdata which is supplied via the data line DL to the pixel electrode PXL. The data signal Vdata transmitted to the pixel electrode PXL may have the signal waveform illustrated in FIG. 17 or 18.

The pixel electrode PXL to which the data signal Vdata is transmitted can form a storage capacitor Cst along with the touch electrode TE2 to which the touch electrode driving signal TDS is supplied. Here, the storage capacitor Cst is a capacitor which is required for storing a voltage for a predetermined time for display.

On the other hand, an internal capacitor Cgs can be formed between the gate electrode and the source electrode (or drain electrode) of the transistor TR. A gate-touch capacitor Cgc can be formed between the gate electrode of the transistor TR or the gate line GL1 and the touch electrode TE2.

When display driving and touch driving are simultaneously performed and the data signal Vdata illustrated in FIG. 17 or 18 is supplied to the pixel electrode PXL, change in charge ΔQ1 which is required for display driving is generated in the storage capacitor Cst. The change in charge ΔQ1 which is generated in the storage capacitor Cst is required for display driving and is natural, but may be unnecessary for touch sensing.

Here, the change in charge ΔQ1 which is necessary for display driving but unnecessary for touch sensing in the storage capacitor Cst is generated by an original data voltage change part (PULSE2 in FIG. 17 and PULSE1 in FIG. 18) for display in the data signal Vdata. When the change in charge ΔQ1 which is necessary for display driving but unnecessary for touch sensing is generated in the storage capacitor Cst as described above, a voltage variation which is unnecessary for touch sensing can be generated in the touch electrode TE2 which is coupled to the pixel electrode PXL via the storage capacitor Cst.

In other words, the original data voltage change part (PULSE2 in FIG. 17 and PULSE1 in FIG. 18) for display in the data signal Vdata causes an undesired voltage variation in the pixel electrode PXL and thus an undesired voltage variation can be generated in the touch electrode TE2. The undesired voltage variation which is caused in the touch electrode TE2 due to the voltage variation of the data signal Vdata can act as noise at the time of touch sensing.

When display driving and touch driving are simultaneously performed, a change in charge ΔQ2 may occur in the gate-touch capacitor Cgc formed between the gate electrode of the transistor TR or the gate line GL1 and the touch electrode TE2 due to a voltage variation (a voltage of a turn-off level <-> a voltage of a turn-on level) of the gate signal Vgate1 which is supplied to the gate line GL1 or the transistor TR connected thereto.

The change in charge ΔQ2 in the gate-touch capacitor Cgc formed between the gate electrode of the transistor TR or the gate line GL1 and the touch electrode TE2 is necessary and natural for display driving but may be unnecessary for touch sensing.

Here, the change in charge ΔQ2 which is necessary for display driving but unnecessary for touch sensing in the gate-touch capacitor Cgc is generated by an original voltage change part (ΔVgate in FIGS. 17 and 18) for display in the gate signal Vgate1.

When the change in charge ΔQ2 which is necessary for display driving but unnecessary for touch sensing is generated in the gate-touch capacitor Cgc as described above, a voltage variation which is unnecessary for touch sensing can be generated in the touch electrode TE2 which is coupled to the gate electrode of the transistor TR or the gate line GL1 via the gate-touch capacitor Cgc.

In other words, the original voltage change part (ΔVgate in FIGS. 17 and 18) for display in the gate signal Vgate1 causes an undesired voltage variation in the touch electrode TE2. The undesired voltage variation which is caused in the touch electrode TE2 due to the voltage variation of the gate signal Vgate1 can act as noise at the time of touch sensing.

When display driving and touch driving are simultaneously performed and the gate lines GL1, GL2, GL3, GL4, . . . overlapping the touch electrode TE2 which is to be sensed out of the touch electrodes TE1, TE2, TE3, TE4, . . . are driven (turned on), the changes in charge ΔQ1 and ΔQ2 in the storage capacitor Cst and the gate-touch capacitor Cgc act as noise components at the time of touch sensing, and thus the data part acquired from the touch electrode TE2 which is to be sensed out of touch sensing data is an overflow value and may not have a meaning as sensing data. As a result, touch sensing may not be normally carried out.

When display driving and touch driving are simultaneously performed as described above, the changes in charge ΔQ1 and ΔQ2 which are necessary and natural for display driving but act as noise for touch sensing can be removed or decreased by the gate driving control illustrated in FIG. 23B.

As described above with reference to FIG. 23B, in the touch display device, the high-level period Pon of the ON-clock signal ON_CLK and the high-level period Poff of the OFF-clock signal OFF_CLK can correspond to each other. That is, the high-level period Pon of the ON-clock signal ON_CLK and the high-level period Poff of the OFF-clock signal OFF_CLK may be temporally the same period or may be periods which partially overlap each other temporally.

Accordingly, the falling section Pdown of the first scan signal Vgate1 which is supplied to the first gate line GL1 out of the plurality of gate lines GL can correspond to the rising section Pup of the third scan signal Vgate3 which is supplied to the third gate line GL3 other than the first gate line GL1 out of the plurality of gate lines GL.

Here, the first gate line GL1 and the third gate line GL3 different therefrom can overlap the same touch electrode TE2. One or more other gate lines GL2 may be disposed between the first gate line GL1 and the third gate line GL3. On the other hand, the first gate line GL1 and the third gate line GL3 may be neighboring gate lines.

Similarly, the falling section Pdown of the second scan signal Vgate2 which is supplied to the second gate line GL2 out of the plurality of gate lines GL can correspond to the rising section Pup of the fourth scan signal Vgate4 which is supplied to the fourth gate line GL4 other than the second gate line GL2 out of the plurality of gate lines GL.

Here, the second gate line GL2 and the fourth gate line GL4 different therefrom can overlap the same touch electrode TE2. One or more other gate lines GL3 may be disposed between the second gate line GL2 and the fourth gate line GL4. On the other hand, the second gate line GL2 and the fourth gate line GL4 may be neighboring gate lines.

Referring to FIG. 23B, according to the above-mentioned gate driving control, when the first scan signal Vgate1 which is supplied to the first gate line Gll out of the gate lines GL1, GL2, GL3, GL4, . . . overlapping one touch electrode TE2 falls (gate OFF), the third scan signal Vgate3 which is supplied to the third gate line GL3 different from the first gate line GL1 rises (gate ON) and thus a charge flow −Q which is caused in the capacitors Cst and Cgc associated with the touch electrode TE2 due to the falling of the first scan signal Vgate1 and a charge flow+Q in the capacitors Cst and Cgc associated with the touch electrode TE2 due to the rising of the third scan signal Vgate3 are opposite to each other.

By these charge flows+Q and −Q which are opposite to each other, influences of the unnecessary changes in charge ΔQ1 and ΔQ2 in the capacitors Cst and Cgc associated with the touch electrode TE2 to the touch electrode TE2 which is to be sensed can be cancelled. Accordingly, overflow of sensing data which is acquired from the touch electrode TE2 which is to be sensed is reduced and touch sensitivity can be enhanced.

Figure 29:
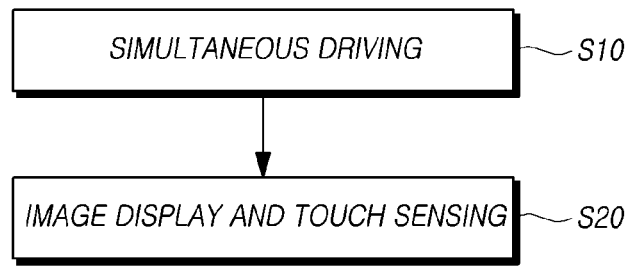
FIG. 29 is a flowchart illustrating a driving method of the touch display device according to one embodiment.

FIG. 29 is a flowchart illustrating a driving method of the touch display device according to one embodiment.

Referring to FIG. 29, a driving method of the touch display device includes a simultaneous driving step S10 and an image displaying and touch sensing step S20.

In the simultaneous driving step S10, the touch display device can output the data signals Vdata and the scan signals Vgate to the data lines DL and the gate lines which are arranged in the display panel DISP and output the touch electrode driving signal TDS to one or more of a plurality of touch electrodes TE which are arranged in the display panel DISP.

In the image displaying and touch sensing step S20, the touch display device can display an image in response to the data signal Vdata and the touch electrode driving signal TDS and sense a touch on the basis of the sensing result of the touch electrode TE to which the touch electrode driving signal TDS is supplied.

The voltage level of the touch electrode driving signal TDS can vary in a section other than the rising section Pup or the falling section Pdown of the scan signal Vgate.

According to the above-mentioned embodiments of the disclosure, it is possible to provide a touch display device, a driving circuit, and a driving method that can simultaneously stably execute display driving and touch driving.

According to the embodiments of the disclosure, it is possible to provide a touch display device, a driving circuit, and a driving method that can simultaneously stably execute display driving and touch driving using a display panel having touch sensors embedded therein.

According to the embodiments of the disclosure, it is possible to provide a touch display device, a driving circuit, and a driving method that can reduce an image defect of a line shape which may be caused by timing mismatch between the gate driving relevant signals ON_CLK, OFF_CLK, GCLK, and Vgate and the touch electrode driving signal TDS.

The above description and the accompanying drawings exemplify the technical idea of the present disclosure, and various modifications and changes such as combination, separation, substitution, and alteration of configurations can be made by those skilled in the art without departing from the scope of the disclosure. Accordingly, the embodiments disclosed in the present disclosure are not to restrict the scope of the disclosure but to explain the technical idea of the disclosure. The scope of the disclosure is not limited to the embodiments. The scope of the disclosure is defined by the appended claims.

What is claimed is:
1. A touch display device comprising:
a display panel in which a plurality of data lines and a plurality of gate lines are arranged, a plurality of subpixels are arranged, and a plurality of touch electrodes are arranged;
a display controller configured to output an ON-clock signal and an OFF-clock signal;
a gate driving circuit configured to output a scan signal to the plurality of gate lines on a basis of the ON-clock signal and the OFF-clock signal;
a data driving circuit configured to output a data signal for displaying an image to the plurality of data lines; and a touch driving circuit configured to supply a touch electrode driving signal to one or more of the plurality of touch electrodes, sense one or more of the plurality of touch electrodes, and output sensing data, wherein a voltage level of the touch electrode driving signal has a first voltage level during a first period and a second voltage level during a second period, the voltage level of the touch electrode driving signal is configured to be changed between the first voltage level and the second voltage level during a third period, and wherein an entire of a high-level period of the ON-clock signal and a high-level period of the OFF-clock signal are configured to be overlapped with the touch electrode driving signal during the first period or the second period.

2. The touch display device according to claim 1, wherein the high-level period of the ON-clock signal and the high-level period of the OFF-clock signal correspond to each other and a low-level period of the ON-clock signal and a low-level period of the OFF-clock signal correspond to each other.

3. The touch display device according to claim 1, wherein a falling section of a first scan signal which is supplied to a first gate line of the plurality of gate lines corresponds to a rising section of another scan signal which is supplied to another gate line other than the first gate line out of the plurality of gate lines.

4. The touch display device according to claim 3, wherein the first gate line and the another gate line overlap a same touch electrode.

5. The touch display device according to claim 1, wherein a frequency of the ON-clock signal and the OFF-clock signal is N or 1/N times a frequency of the touch electrode driving signal, wherein N is a natural number other than 0, and wherein the touch electrode driving signal has a constant duty ratio.

6. The touch display device according to claim 5, wherein if the frequency of the OFF-clock signal is N times a frequency of the touch electrode driving signal, a rising time point of the touch electrode driving signal is set to be later than a falling time point of the OFF-clock signal, or the rising time point of the touch electrode driving signal is set to be earlier than the rising time point of the OFF-clock signal.

7. The touch display device according to claim 1, wherein a frequency of the ON-clock signal and the OFF-clock signal is other than N or 1/N times a frequency of the touch electrode driving signal, wherein N is a natural number other than 0, and wherein the touch electrode driving signal has a variable duty ratio.

8. The touch display device according to claim 7, wherein the touch electrode driving signal rises with a delay after the high-level period of the ON-clock signal and the high-level period of the OFF-clock signal have passed depending on adjustment of the duty ratio, and wherein the touch electrode driving signal falls before the high-level period of the ON-clock signal and the high-level period of the OFF-clock signal have started depending on adjustment of the duty ratio.

9. The touch display device according to claim 1, wherein the voltage level of the touch electrode driving signal varies in a section other than a rising section or a falling section of the scan signal.

10. The touch display device according to claim 1, wherein the touch driving circuit is configured to sense at least one of the plurality of touch electrodes when display driving is being executed by supplying the data signal for displaying an image to the plurality of data lines.

11. The touch display device according to claim 1, wherein the touch electrode driving signal is a signal of which a voltage level varies periodically, wherein a period or a width of a high-level voltage period of the touch electrode driving signal is longer than one horizontal time for display driving, and wherein, in the period or the high-level voltage period of the touch electrode driving signal, a voltage level of the data signal for displaying an image which is supplied to at least one data line of the plurality of data lines varies one or more times, or a voltage level of the scan signal which is supplied to at least one gate line of the plurality of gate lines varies one or more times.

12. The touch display device according to claim 1, wherein the touch electrode driving signal is a signal of which a voltage level varies periodically, wherein a period or a width of a high-level voltage period of the touch electrode driving signal is shorter than one horizontal time for display driving, and wherein, in the one horizontal time for display driving, the voltage level of the touch electrode driving signal varies one or more times.

13. The touch display device according to claim 1, wherein the data driving circuit is configured to convert an image digital signal into an image analog signal in response to a gamma reference voltage, wherein the data driving circuit is configured to output the data signal corresponding to the image analog signal to the data lines, and wherein a frequency and a phase of the gamma reference voltage correspond to those of the touch electrode driving signal.

14. The touch display device according to claim 1, wherein a ground voltage which is applied to the display panel is a modulated signal of which a frequency and a phase correspond to those of the touch electrode driving signal.

15. The touch display device according to claim 1, wherein the touch display device is configured to independently perform display and touch sensing, wherein if the touch display device simultaneously performs display and touch sensing, the touch driving circuit supplies a first touch electrode driving signal of a variable voltage to the plurality of touch electrodes, wherein if the touch display device performs only display, the touch driving circuit supplies a second touch electrode driving signal of a DC voltage to the plurality of touch electrodes, and wherein if the touch display device performs only touch sensing, the touch driving circuit supplies a third touch electrode driving signal of a variable voltage to the plurality of touch electrodes.

16. The touch display device according to claim 15, an amplitude of the first touch electrode driving signal is less than an amplitude of the third touch electrode driving signal.

17. A touch display device comprising:

a display panel in which a plurality of data lines and a plurality of gate lines are arranged, a plurality of subpixels are arranged, and a plurality of touch electrodes are arranged;

a gate driving circuit configured to sequentially output a scan signal to the plurality of gate lines;

a data driving circuit configured to output a data signal to the plurality of data lines; and a touch driving circuit configured to supply a touch electrode driving signal to one or more of the plurality of touch electrodes, wherein a voltage level of the touch electrode driving signal has a first voltage level during a first period and a second voltage level during a second period, the voltage level of the touch electrode driving signal is configured to be changed between the first voltage level and the second voltage level during a third period, and wherein at least one of a rising section of the scan signal and a falling section of the scan signal is configured to be overlapped with the touch electrode driving signal during the first period or the second period.

18. The touch display device according to claim 17, wherein a falling section of a first scan signal which is supplied to a first gate line of the plurality of gate lines corresponds to a rising section of another scan signal which is supplied to another gate line other than the first gate line out of the plurality of gate lines.

19. The touch display device according to claim 18, wherein the first gate line and the another gate line overlap a same touch electrode.

20. A driving circuit comprising:

a data driving circuit configured to output a data signal to data lines which are arranged on a display panel; and a touch driving circuit configured to drive one or more of a plurality of touch electrodes which are arranged on the display panel and output a touch electrode driving signal to one or more of the plurality of touch electrodes, wherein a voltage level of the touch electrode driving signal has a first voltage level during a first period and a second voltage level during a second period, the voltage level of the touch electrode driving signal is configured to be changed between the first voltage level and the second voltage level during a third period, and wherein at least one of a rising section and a falling section of a scan signal which is output to a plurality of gate lines which are arranged on the display panel is configured to be overlapped with the touch electrode driving signal during the first period or the second period.

21. The driving circuit according to claim 20, wherein a falling section of a first scan signal which is supplied to a first gate line of the plurality of gate lines corresponds to a rising section of another scan signal which is supplied a gate line other than the first gate line out of the plurality of gate lines.

22. A driving method of a touch display device including a display panel in which a plurality of data lines and a plurality of gate lines are arranged and a plurality of sub-pixels are arranged, the driving method comprising:

outputting a data signal and a scan signal to the data lines and the gate lines which are arranged on the display panel and outputting a touch electrode driving signal to one or more of a plurality of touch electrodes which are arranged on the display panel; and displaying an image in response to the data signal and the touch electrode driving signal and sensing a touch on a basis of a result of sensing of the touch electrodes to which the touch electrode driving signal is supplied, wherein a voltage level of the touch electrode driving signal has a first voltage level during a first period and a second voltage level during a second period, the voltage level of the touch electrode driving signal is configured to be changed between the first voltage level and the second voltage level during a third period, and wherein at least one of a rising section and a falling section of the scan signal is configured to be overlapped with the touch electrode driving signal during the first period or the second period.

23. The driving method according to claim 22, wherein a falling section of a first scan signal which is supplied to a first gate line of the plurality of gate lines corresponds to a rising section of another scan signal which is supplied to another gate line other than the first gate line out of the plurality of gate lines.

24. The driving method according to claim 23, wherein the first gate line and the another gate line overlap a same touch electrode.

* * * * *